United States Patent
Fjetland

(12) 
(10) Patent No.: US 10,550,581 B2
(45) Date of Patent: Feb. 4, 2020

(54) CORK-BASED TILE FOR PRIVACY APPARATUSES AND METHOD OF MAKING AND USING THE SAME

(71) Applicant: Knoll, Inc., East Greenville, PA (US)

(72) Inventor: Lars Fjetland, Bergen (NO)

(73) Assignee: Knoll, Inc., East Greenville, PA (US)

( * ) Notice: Subject to any disclaimer, the term of this patent is extended or adjusted under 35 U.S.C. 154(b) by 182 days.

(21) Appl. No.: 15/412,315

(22) Filed: Jan. 23, 2017

(65) Prior Publication Data

US 2017/0226749 A1    Aug. 10, 2017

Related U.S. Application Data

(60) Provisional application No. 62/292,948, filed on Feb. 9, 2016.

(51) Int. Cl.
*E04F 13/10* (2006.01)
*E06B 9/24* (2006.01)
(Continued)

(52) U.S. Cl.
CPC .............. *E04F 13/10* (2013.01); *C08J 5/00* (2013.01); *C08L 97/007* (2013.01); *E04B 2/74* (2013.01);
(Continued)

(58) Field of Classification Search
CPC .............. E04F 13/0816; E04F 13/0819; E04F 13/0821; E04F 13/0832; E04F 13/083; E04F 13/0835; E04F 13/0841; E04F 13/0846; E04F 13/085; E04F 13/0851; E04F 13/087107; E04F 13/16; E04F 13/24; E04B 2001/745; E04B 2/74; E04B 2/7405; E04B 2/7416; C08J 5/00
(Continued)

(56) References Cited

U.S. PATENT DOCUMENTS 1,728,231 A * 9/1929 Denk ................. E04F 13/0801
52/482
2,216,206 A * 10/1940 McKee, Jr. ............. E04C 2/292
428/162
(Continued)

FOREIGN PATENT DOCUMENTS

| CH | 190355 A | 4/1937 |
|---|---|---|
| EP | 0354526 A2 | 2/1990 |
| FR | 2462524 A1 | 2/1981 |

OTHER PUBLICATIONS

International Search Report for PCT/US2017/014670 dated Apr. 12, 2017.
(Continued)

*Primary Examiner* — Jessica L Laux
(74) *Attorney, Agent, or Firm* — Buchanan Ingersoll & Rooney PC

(57) ABSTRACT

A privacy apparatus includes one or more substantially cork panels. Each panel can be configured to provide visual and/or sound privacy for a certain work space. The panel can be supported on a floor via one or more base elements and/or may be reinforced in rigidity and/or strength via one or more supports. Some embodiments of the apparatus can include a first panel and a second panel attached together via one or more supports press fit within openings defined in rear faces of the panels.

18 Claims, 19 Drawing Sheets

(51) Int. Cl.
*E04B 2/74* (2006.01)
*C08J 5/00* (2006.01)
*C08L 97/00* (2006.01)

(52) U.S. Cl.
CPC ............. *E06B 9/24* (2013.01); *C08J 2397/00* (2013.01); *C08J 2400/00* (2013.01); *E04B 2002/7479* (2013.01)

(58) Field of Classification Search
USPC ....... 52/483.1, 489.1, 489.2, 506.06, 506.07, 52/506.08
See application file for complete search history.

(56) References Cited

U.S. PATENT DOCUMENTS

| | | | |
|---|---|---|---|
| 2,287,079 A | 6/1942 | Anderson | |
| D164,734 S | 10/1951 | Quinn | |
| 2,821,450 A | 1/1958 | Knoll | |
| 3,248,834 A * | 5/1966 | Polis | E04F 13/0801 52/316 |
| 3,248,838 A | 5/1966 | Stark | |
| 3,777,437 A | 12/1973 | Christen | |
| 4,150,517 A * | 4/1979 | Warner, Sr. | E04F 19/0436 52/288.1 |
| 5,094,174 A | 3/1992 | Grund et al. | |
| 5,111,770 A | 5/1992 | Weelink | |
| 5,155,955 A | 10/1992 | Ball et al. | |
| 5,287,909 A | 2/1994 | King et al. | |
| 5,921,040 A | 7/1999 | Glashouwer et al. | |
| 6,000,180 A | 12/1999 | Goodman et al. | |
| 6,021,613 A | 2/2000 | Reuter et al. | |
| 6,073,399 A | 6/2000 | Shipman et al. | |
| 6,625,935 B1 | 9/2003 | King et al. | |
| 6,874,290 B1 * | 4/2005 | Bokan | E04F 13/0864 52/478 |
| 8,365,798 B2 | 2/2013 | Feldpausch et al. | |
| 8,857,121 B2 * | 10/2014 | Baxter | E04B 9/363 52/506.08 |
| 9,309,677 B1 * | 4/2016 | Anic | E04F 13/0814 |
| 9,845,598 B1 * | 12/2017 | Hsu | E04F 13/0862 |
| 2002/0189180 A1 | 12/2002 | King et al. | |
| 2004/0003562 A1 * | 1/2004 | Haque | E04F 15/04 52/403.1 |
| 2008/0261004 A1 * | 10/2008 | Higgins | B32B 5/24 428/206 |
| 2009/0214827 A1 * | 8/2009 | Howie, Jr. | C08F 265/04 428/143 |
| 2009/0252962 A1 * | 10/2009 | Michl | C03C 25/285 428/375 |
| 2009/0293391 A1 | 12/2009 | Devore | |
| 2013/0160393 A1 * | 6/2013 | Steinmetz | E04C 5/00 52/704 |
| 2014/0096472 A1 * | 4/2014 | Schaefer | E04F 13/148 52/716.1 |
| 2015/0175801 A1 * | 6/2015 | Kim | E04C 2/284 428/416 |
| 2015/0368911 A1 * | 12/2015 | Kuijper | E04F 15/02044 52/483.1 |

OTHER PUBLICATIONS

Written Opinion of the International Searching Authority for PCT/US2017/014670 dated Apr. 12, 2017.

* cited by examiner

CORK-BASED TILE FOR PRIVACY APPARATUSES AND METHOD OF MAKING AND USING THE SAME

CROSS-REFERENCE TO RELATED APPLICATIONS

The present application claims priority to U.S. Provisional Patent Application No. 62/292,948, which was filed on Feb. 9, 2016.

FIELD OF THE INVENTION

Embodiments of the present invention relate to furniture systems and furniture, such as cubicle partitions, privacy screens, and wall paneling. Embodiments of the present invention also relate to methods of making cork based panels that can be used to fabricate such apparatuses.

BACKGROUND OF THE INVENTION

Furniture systems can be utilized in a number of different settings. In office settings, cubicle systems are often used to partition a work space into a number of different work areas. For example, cubicle partitions and privacy screens may be utilized to help define different work areas within a floor of an office building. Examples of such cubicle partitions and privacy screens can be appreciated from U.S. Pat. Nos. 2,287,079, 2,821,450, 3,777,437, 5,094,174, 5,111,770, 5,155,955, 5,287,909, 5,921,040, 6,000,180, 6,021,613, 6,073,399, 6,625,935, 8,365,798, and D164,734, and U.S. Patent Application Publication Nos. 2002/0189180 and 2009/0293391.

Conventional partition systems and privacy screens often utilize a substantial amount of non-recycled material. Further, the aesthetic effect that the appearance of such devices can provide may be limited to only a few different manufactured options.

SUMMARY OF THE INVENTION

A privacy apparatus can include a support element having at least one projecting member and a first panel comprised of cork having a front face and a rear face opposite the rear face. The first panel can have at least one opening defined in the rear face that is sized to resiliently receive the at least one projecting member of the support element.

Some embodiments of the privacy apparatus may be configured to include at least a second panel that has its rear face contact the rear face of the first panel when the rear face of the second panel receives a projecting member of the support element to form a body of the privacy apparatus. Such embodiments may be configured for work surface privacy screens or as a floor supported privacy screen. In other embodiments, such a configuration can be utilized to form a partition wall for at least partially defining a work space of an office building. In yet other embodiments, such a body can be provide a noise reduction baffle that can be mounted to a ceiling or otherwise positioned above a work space to reduce noise and/or improve the privacy of personnel within that work space.

In some embodiments where the apparatus includes two or more panels, a first panel can be connected to a second panel to form a body (e.g. a baffle body or a privacy screen body, a partition wall body, etc.). For such embodiments, at least one projecting member of at least one first support element can include a first projecting member and a second projecting member that projects in a direction that is opposite the direction of projection for the first projecting member. The first projecting member can be receivable within the at least one opening defined in the rear face of the first panel and the second projecting member of the support element can be received within at least one opening defined in a rear face of the second panel for interconnecting the panels together and to provide additional rigidity to the formed body. Multiple support elements arranged horizontally and/or vertically may be utilized for interconnecting the first and second panels and/or for interconnecting multiple other panels (e.g. first, second, third, fourth, fifth and sixth panels, etc.).

Other embodiments of a privacy apparatus can include a plurality of panels comprised substantially of cork. Each of the panels can have a front face and a rear face opposite the front face. The rear face of each panel can have at least one opening defined therein. The apparatus can also include a plurality of elongated supports configured to be fastened to a wall of a building or a frame of a partition for defining a wall or divider for a work space organizational system. Each of the supports can have a flat rear face and a projection on a front face that is opposite the rear face. The projection can extend frontwardly away from the flat rear face and be sized and configured to be press-fit within the opening of the panel for mounting the panel to the support. The plurality of panels can be configured to be arranged on the wall of the building via the supports in any of a number of arrangements to provide a wall covering that can improve the sound privacy of a room or office space. The arrangement of panels can also provide a desired aesthetic effect to the wall.

A method of forming a privacy apparatus is also provided. Embodiments of the method can include providing cork granules obtained from grinding cork bark, molding the cork granules in a mold to form a panel that has a front face and a rear face opposite the front face where the rear face has at least one opening define therein. The method can also include providing at least one support. Each support can have at least one projection sized to be press-fit within the opening formed in the rear face of the panel.

In some embodiments, the cork panels can be molded after being mixed with a binder. The binder may be a polymeric resin, for example. The mixture of resin and cork may be a dry solid particulate mixture that may be fed into a mold and subsequently exposed to heat and pressure to mold the substantially cork panel. In some embodiments, the heat and pressure can be provided by steam that is fed to the mold after the mold is filled with the mixture of resin and cork granules. The steam may be fed into the mold after the mold is closed and after it was filled with the resin and cork granules. The mold may subsequently be opened to release the formed, molded panel from the mold.

In addition to substantially cork panels, one or more support elements and/or base elements can be provided. These elements can be provided such that each includes at least one projection for insertion into an opening defined in the panel to facilitate mounting or fabrication of the privacy apparatus. In some embodiments, the support elements may be composed of wall mountable metal extrusions that are mountable to a wall via fasteners. In other embodiments, the support elements may be metal members that are configured for forming a body of the privacy apparatus by being positionable between multiple panels for attachment of the panels together to form the body of the privacy apparatus. In yet other embodiments, the support elements can be configured for mounting of a body formed from the connection of at least two panels to form a baffle that can be positioned above a work surface (e.g. mounted to a ceiling or mounted adjacent to a ceiling).

Other details, objects, and advantages of the privacy apparatus and method will become apparent as the following description of certain exemplary embodiments thereof proceeds.

BRIEF DESCRIPTION OF THE DRAWINGS

Exemplary embodiments of cork based panels, privacy apparatuses that can be formed from such panels, and methods of making the same are shown in the accompanying drawings. It should be understood that like reference numbers used in the drawings may identify like components.

DETAILED DESCRIPTION OF EXEMPLARY EMBODIMENTS

Embodiments of a privacy apparatus can be made with a large amount of recycled material. Such embodiments may allow privacy apparatuses to be fabricated from a large amount of renewable material, which can reduce waste and allow high quality products to be made from materials that often have lower costs as compared to non-recycled materials. Embodiments of the privacy apparatus can also be configured to provide improved privacy visually and audibly by blocking sight and also reducing an amount of audible volume that may be transmitted past structures of certain privacy apparatus elements composed of cork material.

Figure 1:
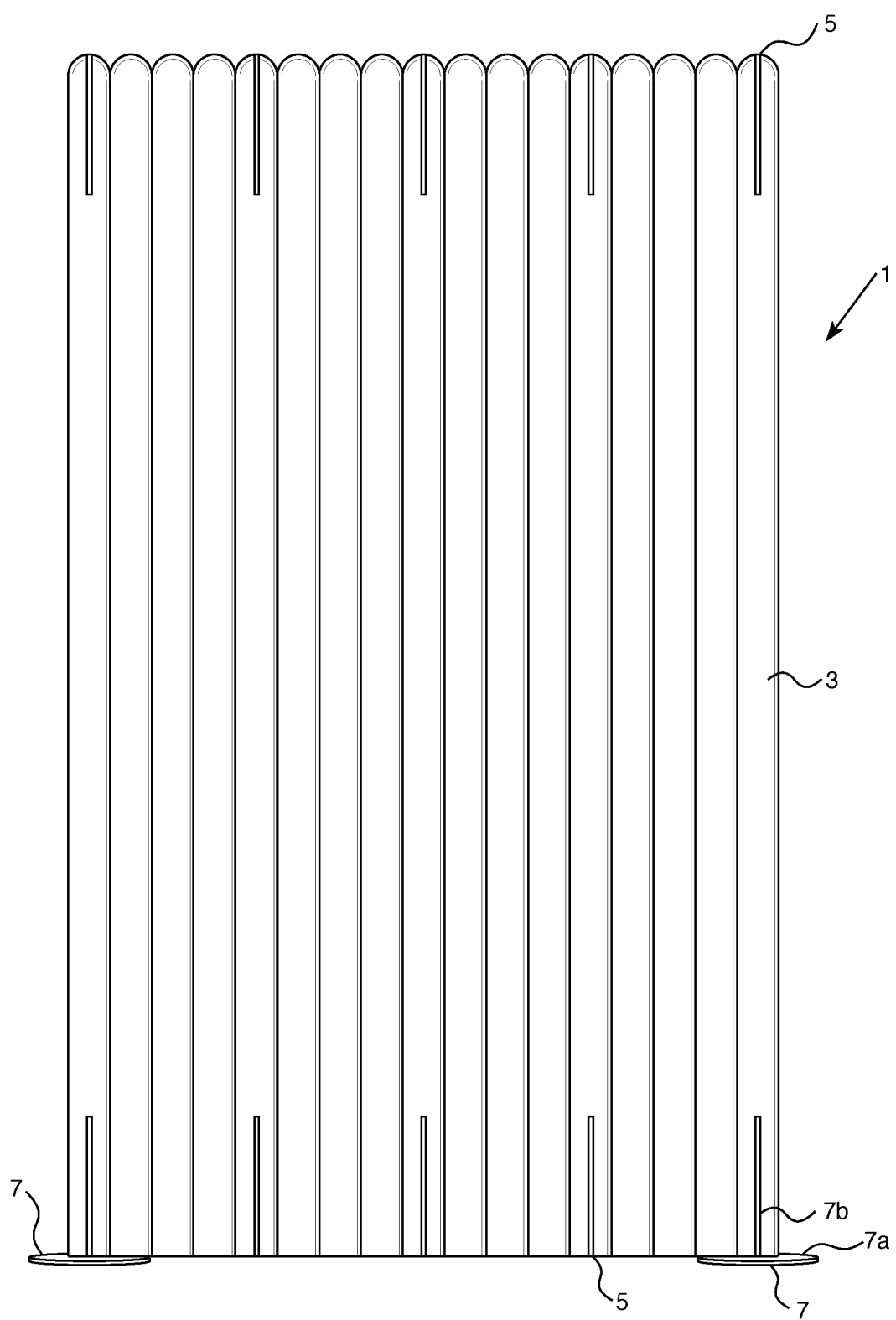
FIG. 1 is a perspective view of a first exemplary embodiment of a privacy apparatus.
Figure 2:
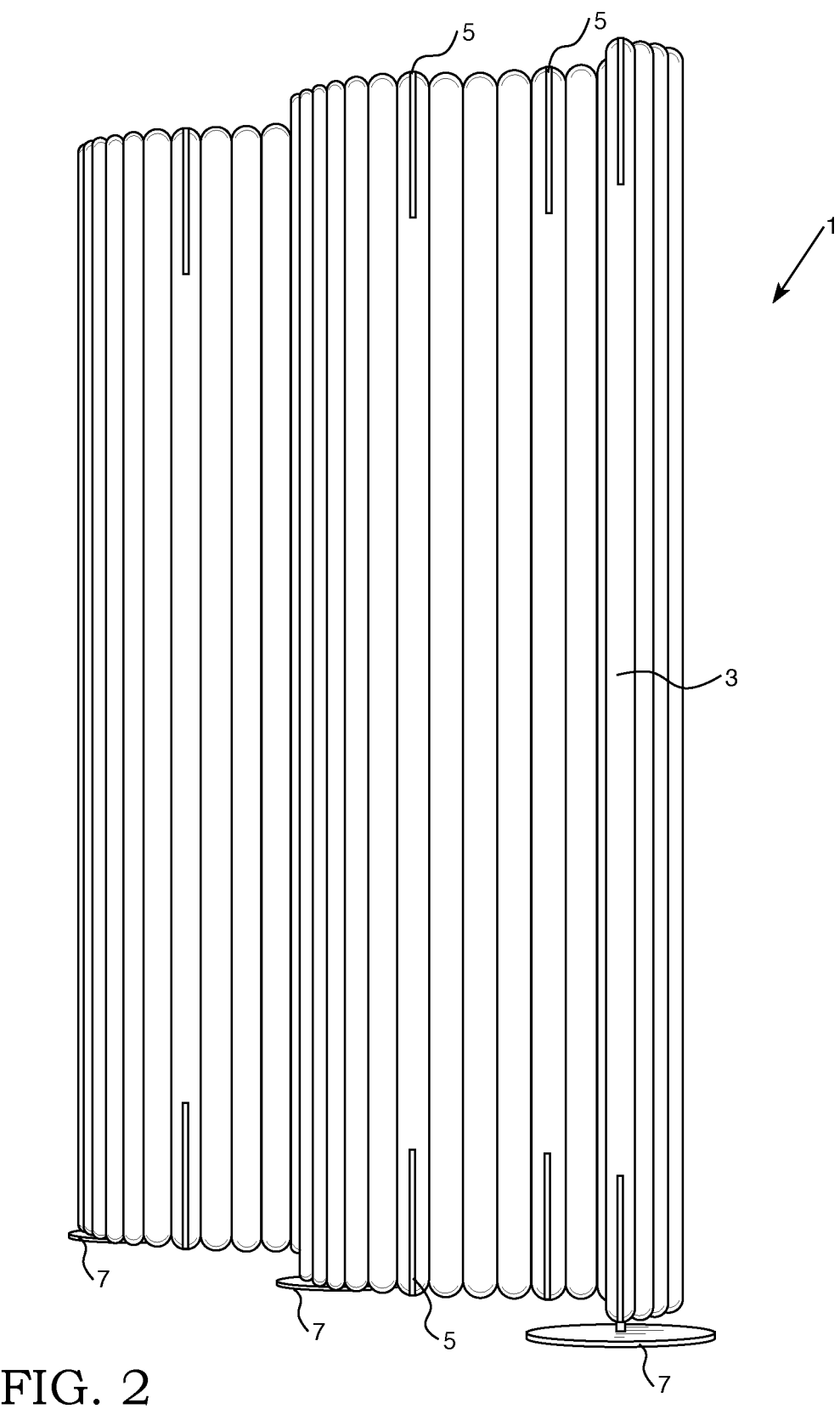
FIG. 2 is perspective view of a second exemplary embodiment of a privacy apparatus.
Figure 3:
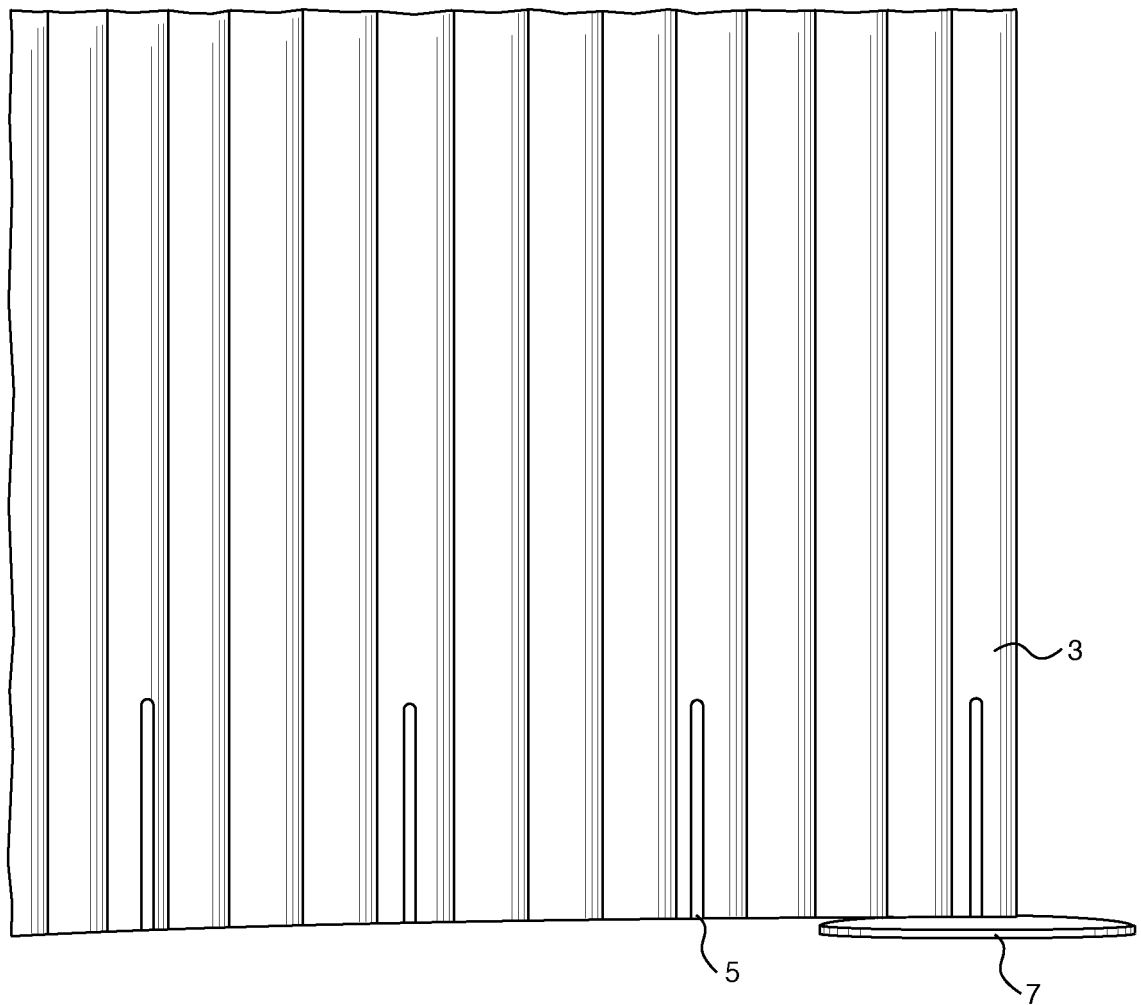
FIG. 3 is an enlarged fragmentary view of an exemplary stand element that is a component of the first and second exemplary embodiments of the privacy apparatus.
Figure 4:
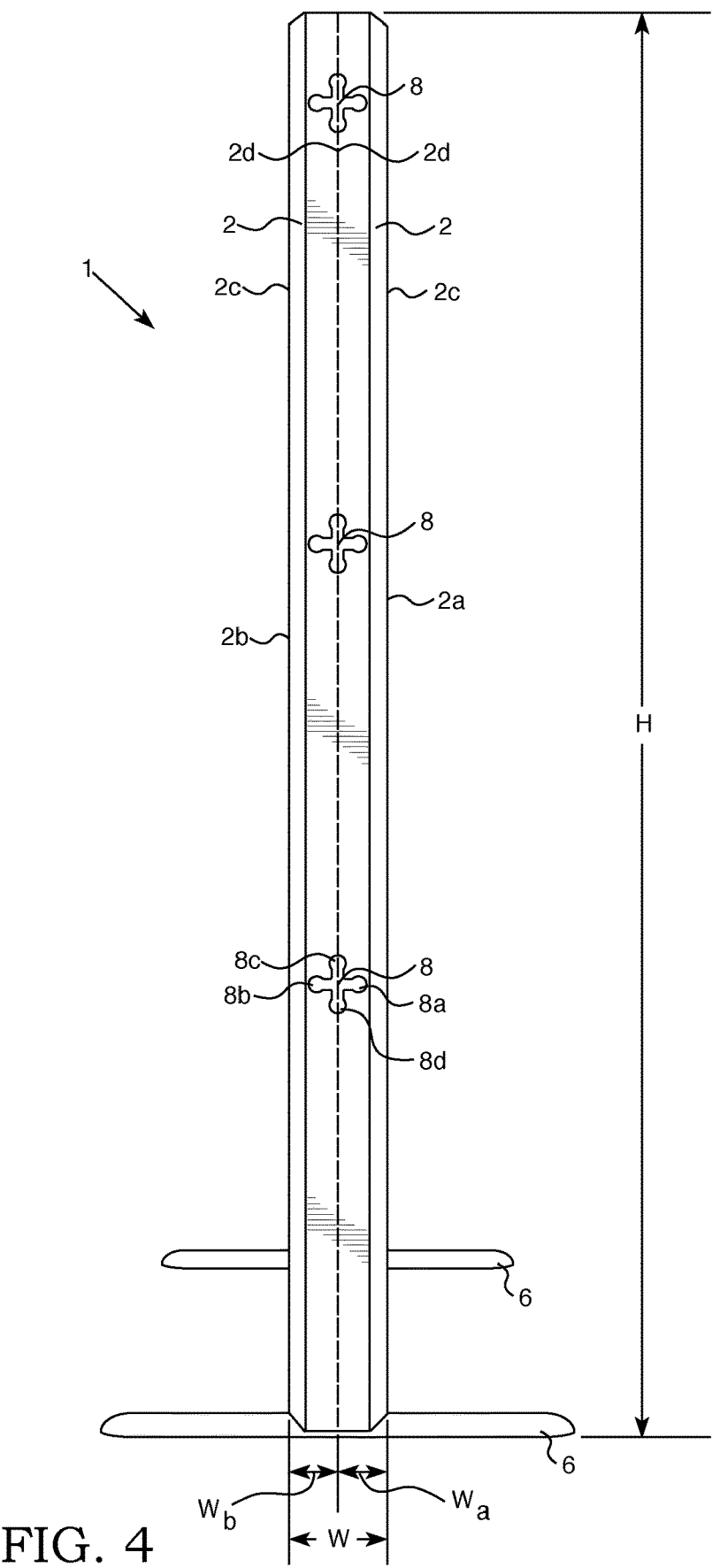
FIG. 4 is a side view of a third exemplary embodiment of a privacy apparatus.
Figure 5:
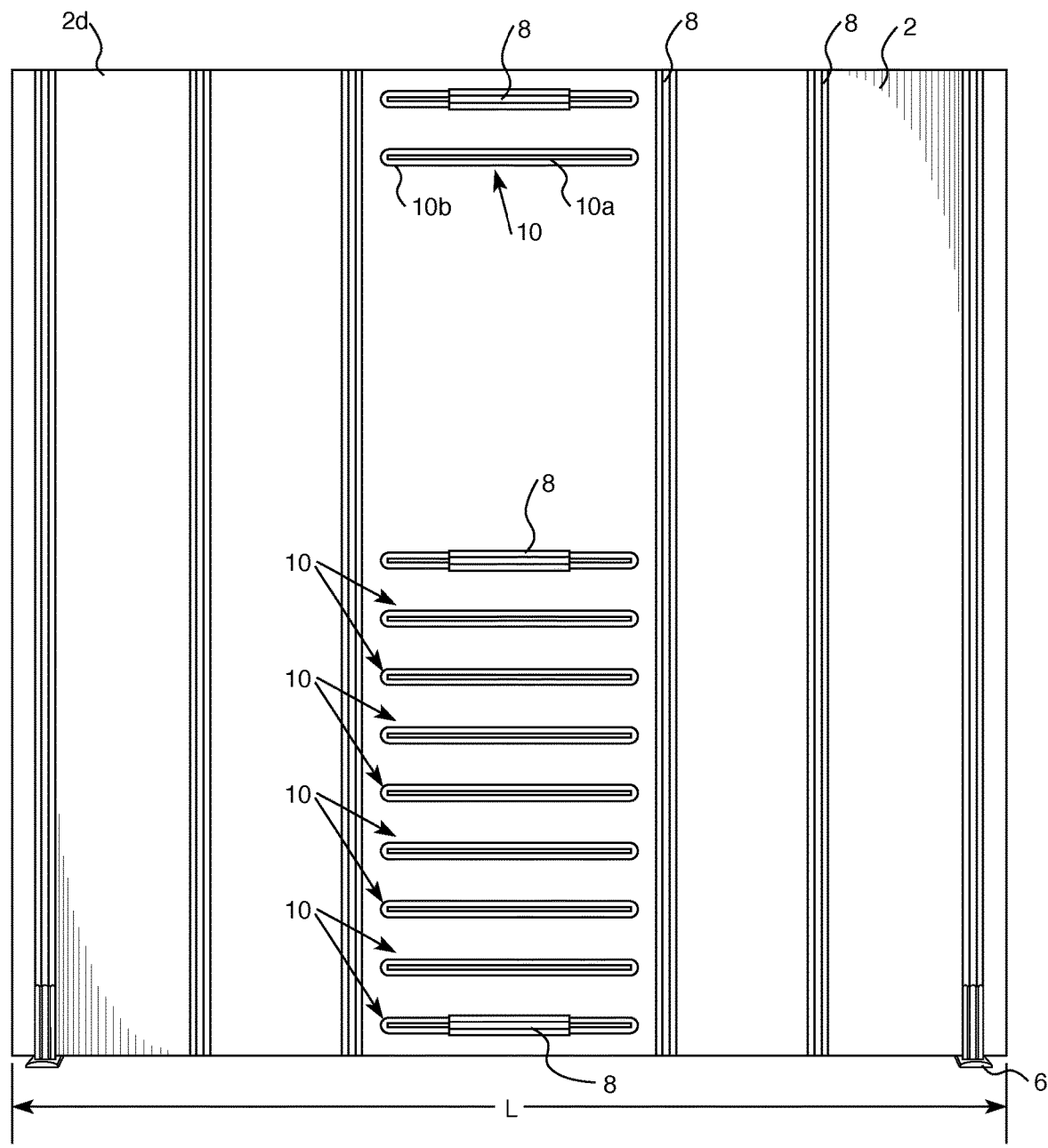
FIG. 5 is a perspective view of the third exemplary embodiment of the privacy apparatus with a front tile removed to illustrate internal components of the embodiment.

Referring to FIGS. 1-3, embodiments of the privacy apparatus 1 may be configured as a floor standing privacy screen. Such embodiments may include a cork panel 3 that is formed from molding of cork material. The cork panel 3 may have a plurality of slots defined therein adjacent top and/or bottom edges of the panel. Some slots 5 may be elongated and extend from the top edge into the panel to a pre-selected length and other slots 5 may be elongated and extend from the top edge into the panel to a pre-selected length. Each of the slots 5 can be sized and configured to receive a stand element 7. The stand elements 7 can include a base portion 7a that is attached to an elongated attachment portion 7b that extends vertically from the base portion 7a. The base portion 7a can be configured to engage a work surface such as a floor. The elongated attachment portion 7b may be sized to be press fit within any of the slots 5 define in the panel 5. The panel 5 may be composed of cork so that the body of the panel defining the slots resiliently deforms to allow the slots to increase in size in response to the press fitting of the elongated attachment portion 7b into the slot 5. The elasticity of the cork material also allows the body of the panel to resiliently press against the attachment portion 7b positioned in a slot to help maintain the elongated attachment portion 7b within the slot 5.

Referring to FIGS. 4-8 and 21-22, embodiments of the privacy apparatus can also be formed from multiple substantially cork molded panels 2 that are fastened to each other to form a privacy screen body. The panels 2 can also be considered tiles for some embodiments. Such privacy screen embodiments can be sized for providing a floor standing privacy screen or have a smaller size that is more suitable for desktop mounted privacy screen applications, countertop privacy screen applications, tabletop mounted privacy screen applications or countertop mounted privacy screen applications. Embodiments of this type of privacy screen apparatus 1 can include base elements 6 that include work surface contacting portions and panel connecting portions 6a that vertically extend from the work surface contacting portions. In yet other embodiments, the privacy screen can be structured as a wall partition for a work space (e.g. a cubicle work space).

The body of the privacy apparatus can be supported by the base elements 6 on a work surface (e.g. a floor, tabletop, desktop, countertop, etc.) can be formed from multiple cork molded panels 2. Each of the panels 2 can have a top, a bottom, a left side, a right side, a front face 2c, and a rear face 2d. The rear face 2d of each panel may have openings defined therein to receive support elements 8 and/or portions of base elements 6. The front face of each panel may be shaped via molding to have a particular configuration to provide a desired aesthetic effect (e.g. patterns defining a particular profile, plurality of grooves and/or depressions of the same or differing depths, and/or other features). In some embodiments, the front face may be composed of cork such that the front face is a tackable surface.

The body can be fabricated from a first panel 2a and a second panel 2b that are attached together via support elements 8 and base elements 6 press fit within openings defined in the rear faces of three panels. The elongated support elements 8 can be positioned between the first and second panels 2a and 2b to facilitate attachment of those panels together and to help improve a structure strength and/or rigidity of the body supported by the work surface engaging portions of the base elements 6. The support elements may be metallic, polymeric, or composite members that are elongated and formed to have a pre-selected cross-section and are configured to help provide additional rigidity, strength, and or toughness to interconnected panels 2.

The first and second panels 2a and 2b may each have the same construction and have the same width, length L, and height H. For example, the first panel 2a may have a first width Wa, a first length L, and a first height H and the second panel 2b can have a second width Wb, second length L and second height H. Alternatively, it is contemplated that the first panel 2a could have one or more of these dimensions differ from that of the second panel 2b. Such a configuration of the panels could be provided to meet a particular design criteria and to match up with particular design configurations of base elements 6 and support elements 8.

Figure 6:
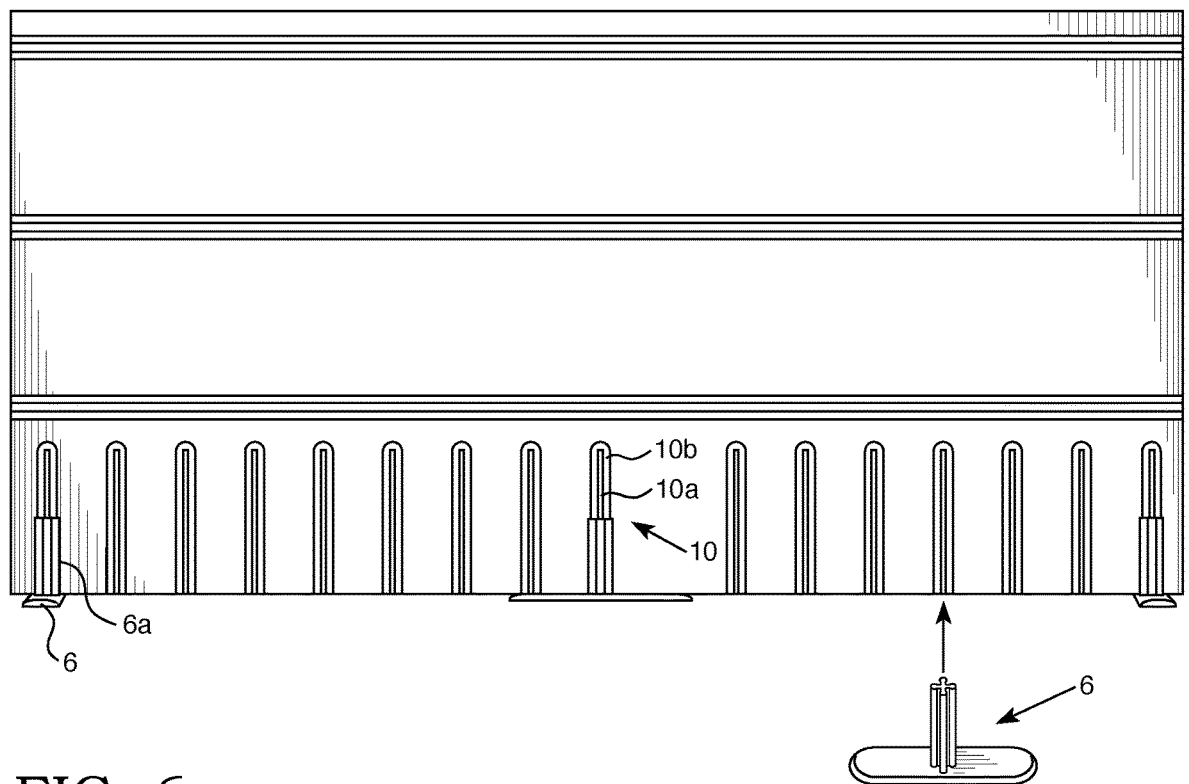
FIG. 6 is a perspective view similar to FIG. 5 of a fourth exemplary embodiment of a privacy apparatus.
Figure 7:
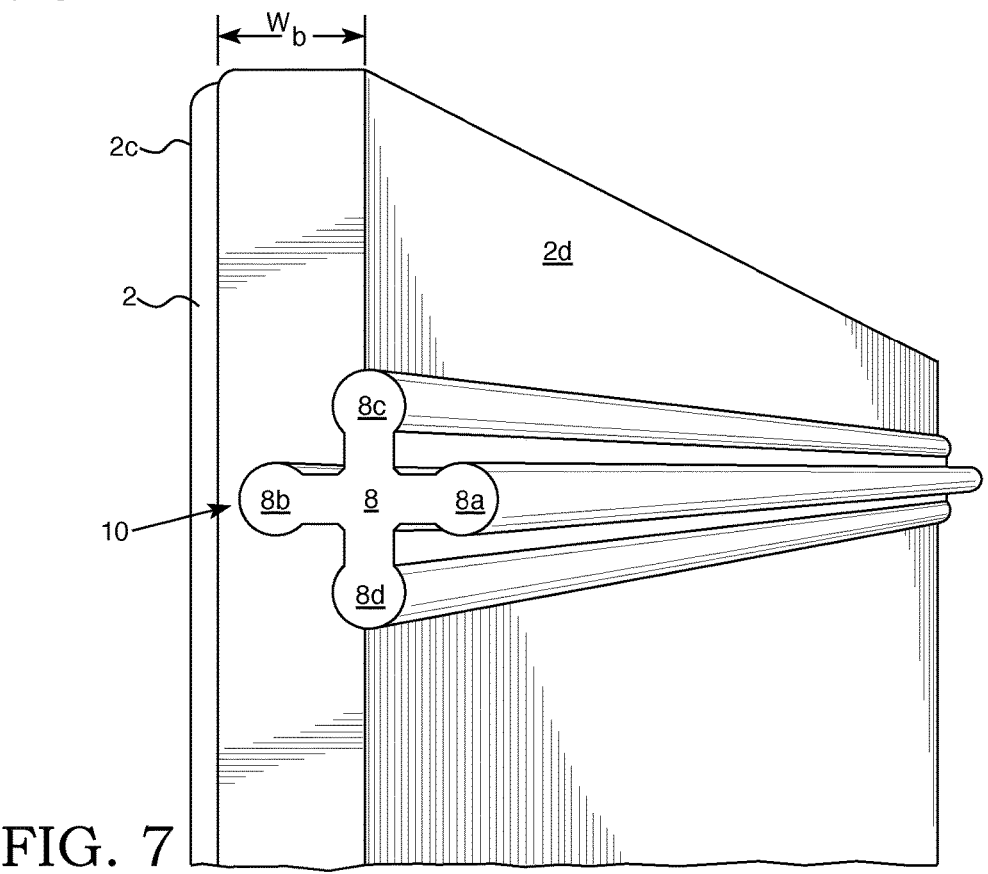
FIG. 7 is an enlarged perspective view of an exemplary support element being attached to an exemplary tile element that is present in the construction of the third and fourth exemplary embodiments of the privacy apparatus.
Figure 8:
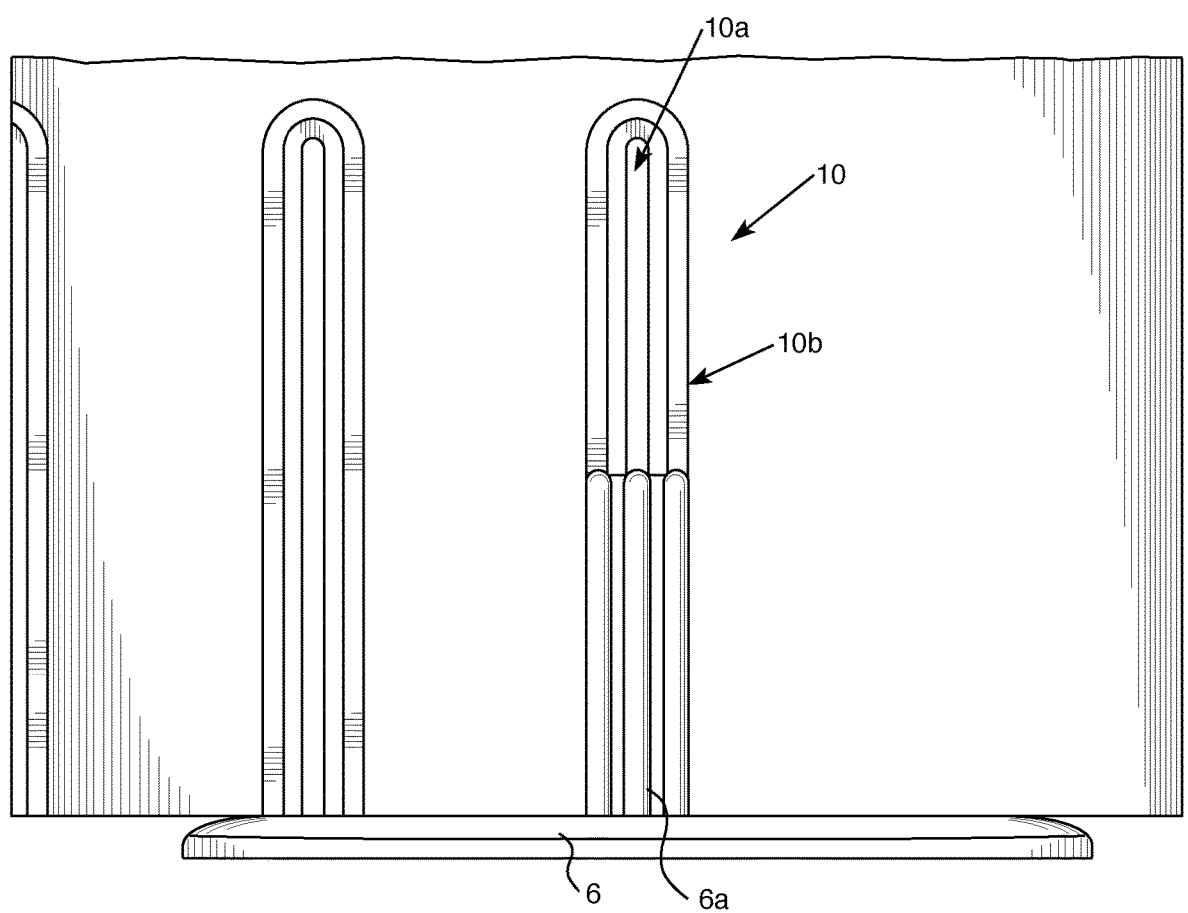
FIG. 8 is an enlarged perspective view of an exemplary stand element being attached to an exemplary tile element that is present in the construction of the third and fourth exemplary embodiments of the privacy apparatus.
Figure 9:
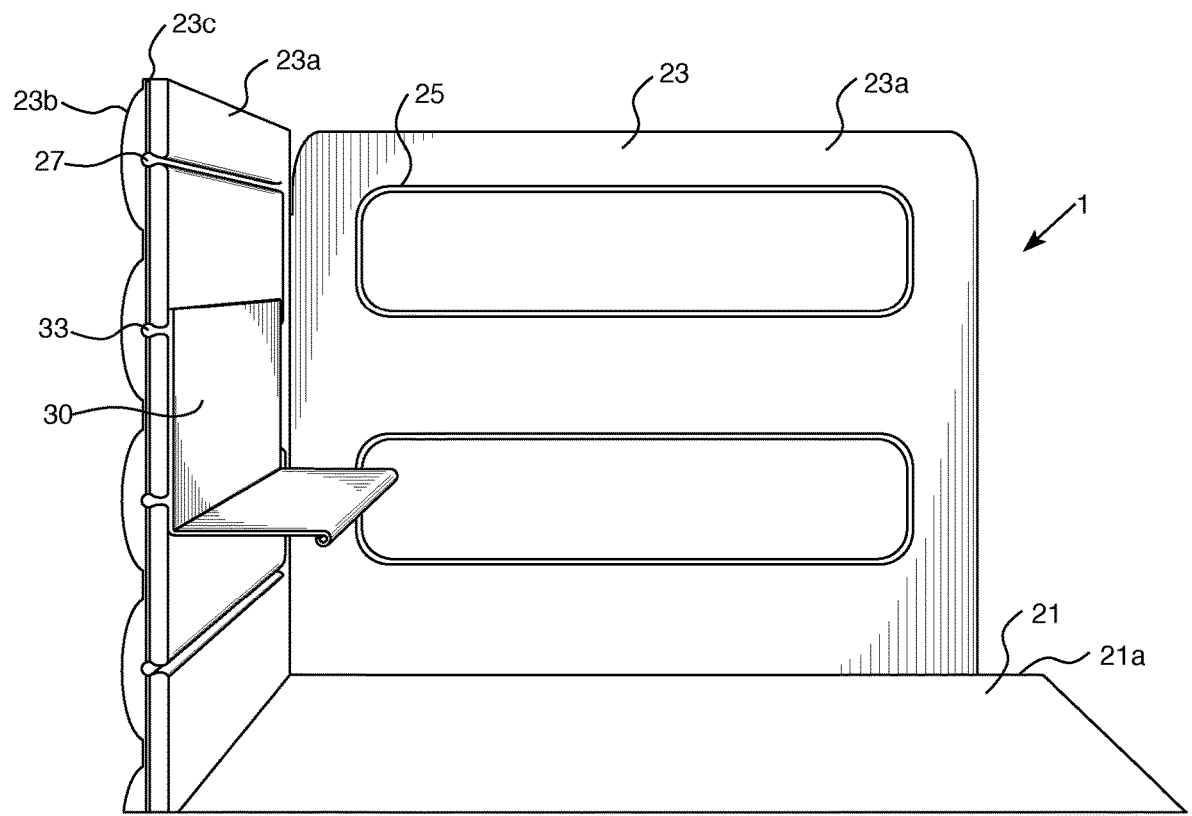
FIG. 9 is a perspective view of a fifth exemplary embodiment of a privacy apparatus mounted to edges of a work surface (e.g. a table top, a counter top, a desktop, etc.).
Figure 10:
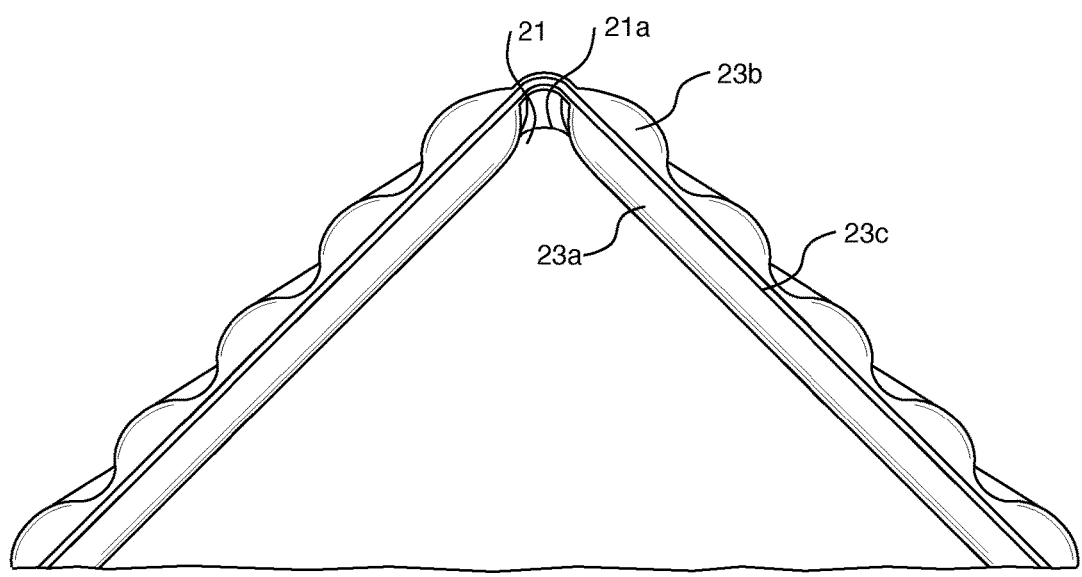
FIG. 10 is a fragmentary top view of the fifth exemplary embodiment of the privacy apparatus.
Figure 11:
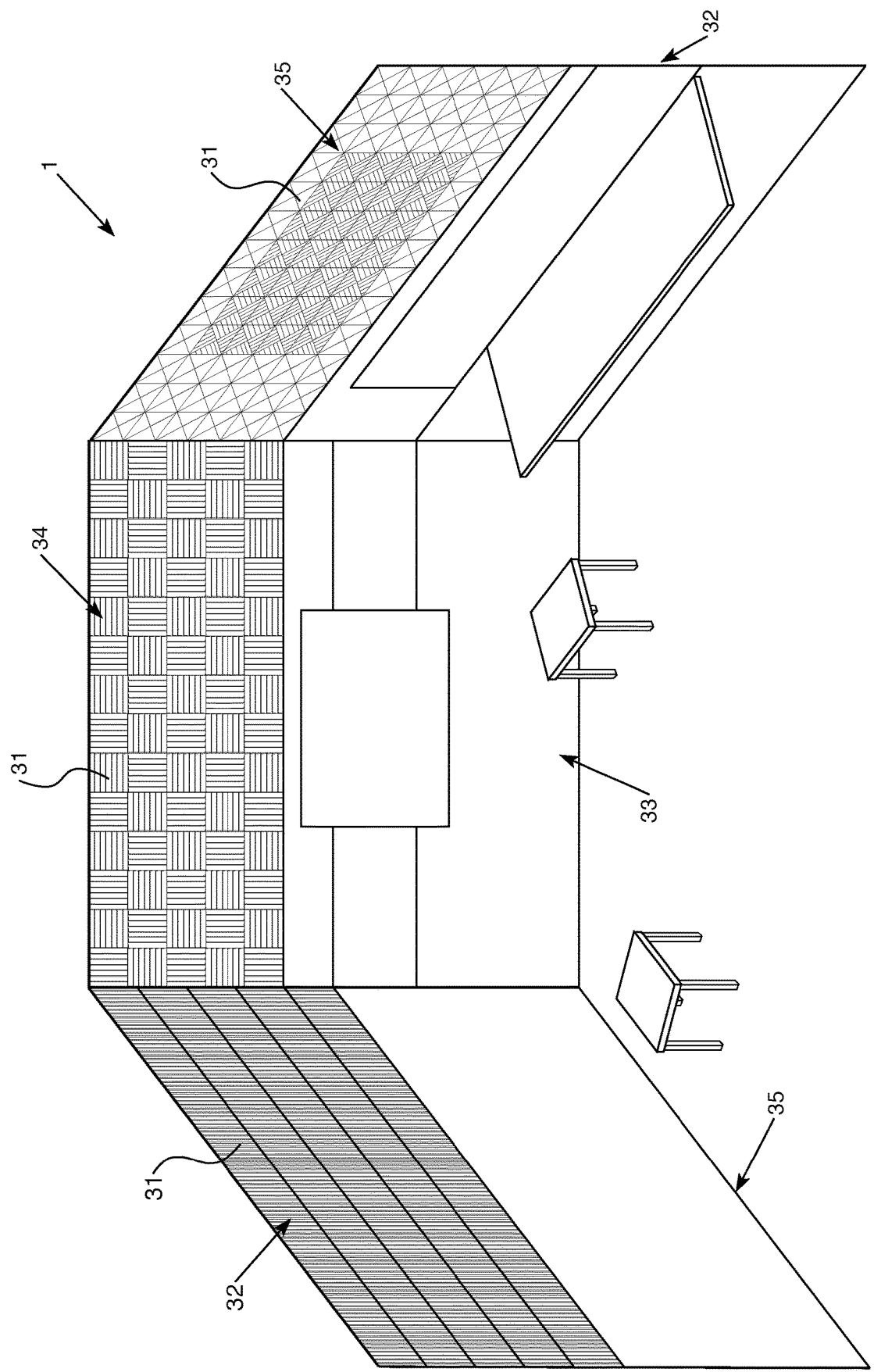
FIG. 11 is a perspective view of a sixth embodiment of a privacy apparatus.
Figure 12:
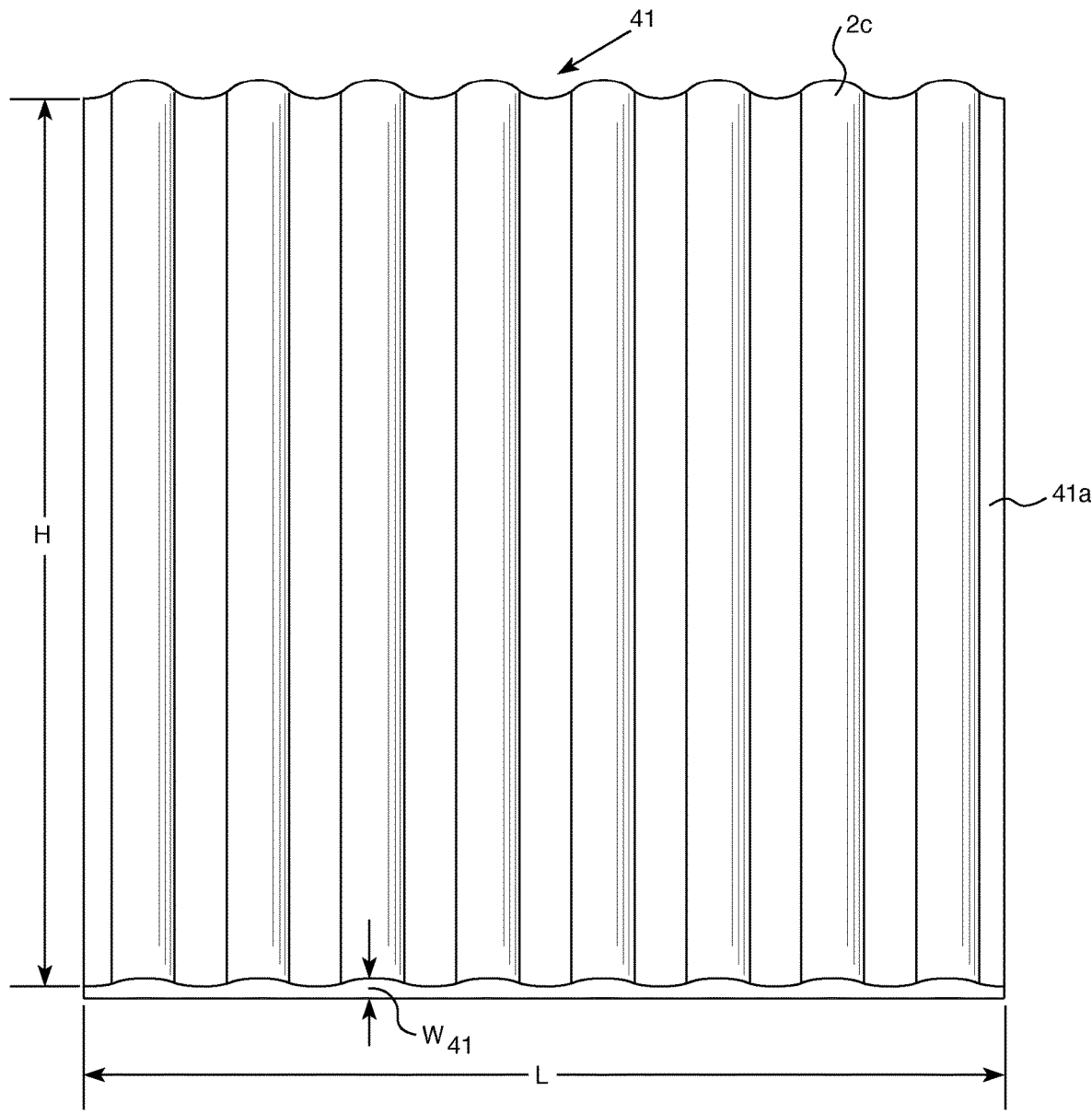
FIG. 12 is a perspective front view of a first exemplary tile that may be utilized in the sixth embodiment of the privacy apparatus.

As can be appreciated from FIGS. 6-8, the panels 2 can each be connected to support elements 8 and base elements 6 via press fitting those elements within openings 10 defined in a rear face of the panel. Such a configuration can allow for a fabrication of the privacy screen apparatus to occur without the use of any mechanical tools (e.g. a screwdriver, hammer, wrench, etc.). The rear faces of the panels 2 may contact each other upon the openings of the rear faces receiving the support elements 8 and/or base elements 6 to form the body of the privacy apparatus. For some embodiments, the formed body may have a width W that is the sum of the first and second widths Wa and Wb of the first and second panels 2a and 2b. The height H and length L of the formed body may be the same as the height and length of the first and second panels 2a and 2b.

The openings 10 can be shaped to have different segments of different depths within the panel 2. For instance, each opening 10, may have a central channel 10a that has a deeper depth within the panel than an outer channel 10b that surrounds the central channel 10a. The central and outer channels 10a and 10b can be sized and shaped to receive portions of support elements 8 and/or base elements 6. For example, each support element 8 may have a particular cross-sectional shape that defines a profile for being received within the central and outer channels 10a and 10b for being releaseably connected to the panel 2 via opening 10. The size of the central and outer channels 10a and 10b may be sized to resiliently compress upon a side of the support element 8 being inserted into the opening 10. The resiliency of the panel may then cause the area of the panel that defines opening 10 to resiliently push or press against the part of the support member received in the opening 10 to help hold the support member within the opening 10.

The support element 8 can be shaped to have an X-shaped cross section in some embodiments that have a first side 8a, second side 8b, third side 8c, and fourth side 8d. Each side may help define the same profile so that any of the sides may be positioned within the opening 10. In other embodiments, it is contemplated that only two opposite sides of the support element 8 may have a pre-selected profile for receipt into a particular set of openings 10 defined in the rear faces of panels 2 that are to be joined together to form a body of a privacy screen. For instance, the profiles for the support elements can be configured so that the support elements can have one or more projecting members extending from opposite sides of the elements (e.g. a first projecting member extending from a first side and a second projecting member extending from a second side opposite the first side). As another example, the support elements 8 can also include projecting members that include multiple projecting members extending from different sides (e.g. a first projecting member extending from a first side and a second projecting member extending from a second side opposite the first side and a third projecting member extending from a third side and a fourth extending member extending from a fourth side that is opposite the third side, etc.).

The base elements 6 can also include an attachment portion 6a that has a cross-sectional profile for being received in one or more openings 10. Those openings 10 can have the same shape and structure as the openings for receiving the support elements 8 or may have different shapes for receiving different cross-sectional profiles or shapes of the attachment portion 6a of the base elements 6. The attachment portions 6a can extend vertically from a surface contacting base portion of the base elements that may be configured to contact a floor, countertop, tabletop, desktop, or other work surface. The cross-section of the base attachment portion may be generally X-shaped and have multiple sides that are configured exactly like the cross-section of the support element 8 shown in FIG. 7. The rear face of the panel may receive the attachment portion via press-fit or other insertion into the opening 10 in the same way that the support member 8 is received and resiliently grasp that inserted attachment portion in the same way the support element 8 is resiliently grasped. In other embodiments, that cross-sectional shape of the attachment portion 6a of the base elements 6 may differ from the shape of the support elements 8 to mate with openings of a corresponding shape for receiving that other shape and the panel may resiliently grasp the inserted attachment portion 6a for holding the base element 6 to the panel and releaseably attaching the base element to the panel without a need for the user of any mechanical tool (e.g. wrench, screwdriver, hammer, etc.).

The length or height of the openings 10 may be arranged differently. For instance, in some embodiments, the openings may extend continuously along the length L or height H of the panel. In other embodiments, some openings 10 may extend continuously along the length L or height H while other openings may extend from an outer edge of the panel for a pre-selected distance in a direction that is transverse to those other openings (e.g. perpendicular or within 10° of perpendicular) as shown in FIG. 6. As can be seen from FIG. 5, some of these openings 10 can be arranged as a second set of openings that are positioned within a central region of the rear face of the panel or in one or more other regions between opposite ends of a panel and be oriented to extend in a direction transverse to a first set of openings that may extend along the entire length L or height H of the panel to provide certain pre-defined attachment profiles to provide an improved strength of attachment at those locations between first and second panels 2a and 2b and/or to also provide greater stiffness at such regions. All the transverse openings of the second set of openings may be located between two immediately adjacent spaced apart other openings 10 of the first set of openings. There may be additional sets of openings that are arranged between immediately adjacent spaced apart openings of the first set of openings as well. Each such set of openings may be arranged between a respective group of two immediately adjacent openings in the first set of openings.

Embodiments of the privacy apparatus can also be configured to not need base elements for supporting the body of the privacy apparatus on a work surface. For example, embodiments of the privacy apparatus may include a body 23 that is configured for attachment to one or more edges 21a of a work surface 21, such as edges of a tabletop, desktop, or countertop. The body of the privacy apparatus 23a can include openings that are shaped to resiliently receive one or more edges of a work surface 21 to be releaseably attached to the work surface. The support of the work surface such as the base of a desk or legs of a table may then support the privacy apparatus via its attachment to the work surface. Such embodiment of a privacy apparatus 21 can also include other openings defined within an inner face 23a of the body such as linearly extending openings 27 and circuitous channels 25. These openings can be defined for receiving and holding different elements, such as shelving units 30 that have connectors 33 attached thereto or extending therefrom for being positioned within the openings 27 or channels 25 for being resiliently affixed within the opening for releasable attachment to the body 23. In addition to (or instead of) shelving, the circuitous channels 25 and linearly extending openings 27 can be configured to receive chalk boards, white boards, monitor mounts, electronic tablet mounts, cabinetry, or other elements. The outer face 23b of the body 23, which is opposite the inner face 23a, can be configured to have a pre-defined structural shape to provide a desired aesthetic effect. The height and length of the body 23 can be configured to provide a desired level of privacy to account for the contemplated positioning of the privacy apparatus 23 and relative heights of the work surface 21 to which the privacy apparatus is to be attached. In some embodiments, the body 23 can include a support element 23c positioned between the inner and outer faces 23a and 23b that is configured to provide additional stiffness, rigidity, and/or strength to the body 23 of the privacy screen apparatus. This support element 23c may be positioned within a mold and the inner and outer faces 23a and 23b may be molded to that support element 23c. Alternatively, the inner and outer faces 23a and 23b may be separate panels that are fastened to the support element 23c via a press-fit aperture system similar to the system disclosed above with respect to the embodiments of FIGS. 4-8. For such embodiments, the support element 23c could be a unitary sheet having one or more profiles on each of opposite faces for attachment to different panels or may be composed of multiple beams, rods, or other structural members having a pre-selected cross-sectional shape for positioning within different openings on different panels for attachment of those panels via press-fit reception within those openings. The resiliency of the panels may facilitate a compression on the support elements for holding of those elements and to facilitate the attachment of the inner and outer faces 23a and 23b together.

Referring to FIGS. 11-20, embodiments of the privacy apparatus 1 can also be configured to be structures that are formed for wall mounting of various panels to form wall coverings and/or define walls for a work space, such as a cubicle, a room, or an office. For instance, a work space may be defined by at least one wall 31 of a building. Each wall 31 may be formed from plaster or drywall that is attached to joists or other support elements of a building. The walls of the work space may be defined by multiple interconnected panels that are mounted to each wall 31 of the building. The panel formed walls of the work space may include first, second, and third paneling arrangements 32, 34, and 35 or may be configured to have the same paneling arrangement for each wall of the work space. The shape of the work space can define how many walls the work space has. Some work spaces may be shaped hexagonally or circularly such that there are different numbers of paneling wall arrangements and shapes for such arrangements based on the selected shape for the work space. Stools, seats, or other office furniture may be included in the work spaces. The paneling arrangements can be configured to define openings for holding different elements (e.g. desktops, tabletops, white boards, monitors, etc.) as well.

Referring to FIGS. 12-20, the first, second, and third paneling arrangements 32, 34, and 35 may each be defined by an arrangement of panels 41 that are mounted to building walls 31 or walls of a partition system that defines work spaces within a room of a building. Each of the panels may have a structure similar to panels 2 discussed above with reference to FIGS. 4-8. For instance, the panels 41 can include front and rear faces 2c and 2d, and have a height H, length L and width $W_{41}$. The front face 41a of each panel 41 can be structured to provide a pre-selected aesthetic effect. For instance, the front face may have a plurality of defined grooves that are spaced apart by thicker regions to define a plurality of elongated furrows or grooves. The front face 41 may alternatively have other aesthetic effects provided by different arrangements for the front face 41a that can be defined by a different arrangement (or definition) of opening locations and other definition of geometric shapes or other profiles on the front face 41. For example, panels can have the shape and front face appearance of the panel 42 shown in FIG. 14 and have a hexagonal shape instead of a rectangular shape. As another alternative, the panels could have a triangular shape or a circular shape and/or have other type of decorative front faces. The front face of each panel may provide a tackable surface for the removable mounting of papers or other things via pins, thumbtacks, or the like.

Figure 13:
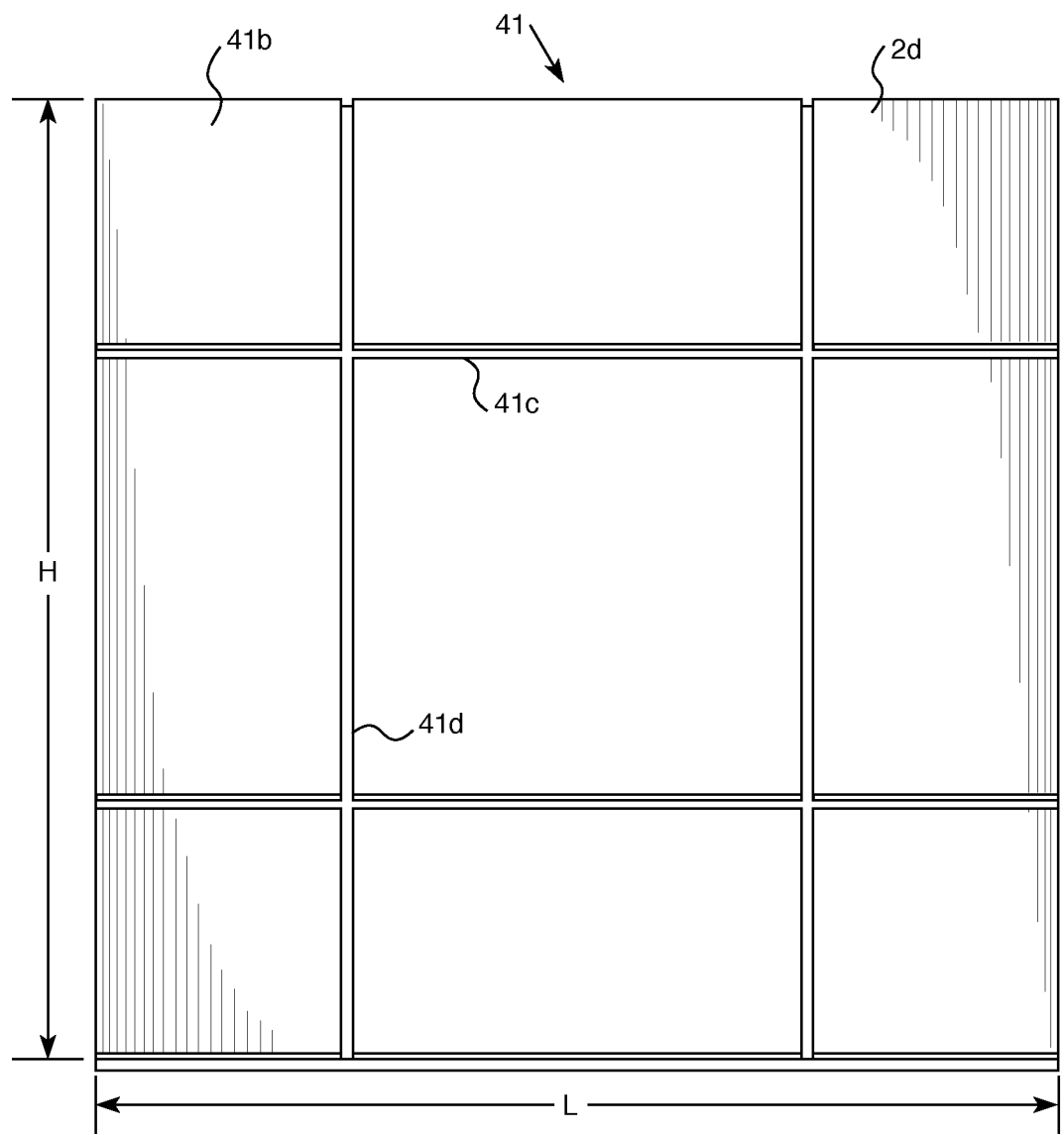
FIG. 13 is a perspective rear view of the first exemplary tile that may be utilized in the sixth embodiment of the privacy apparatus.
Figure 14:
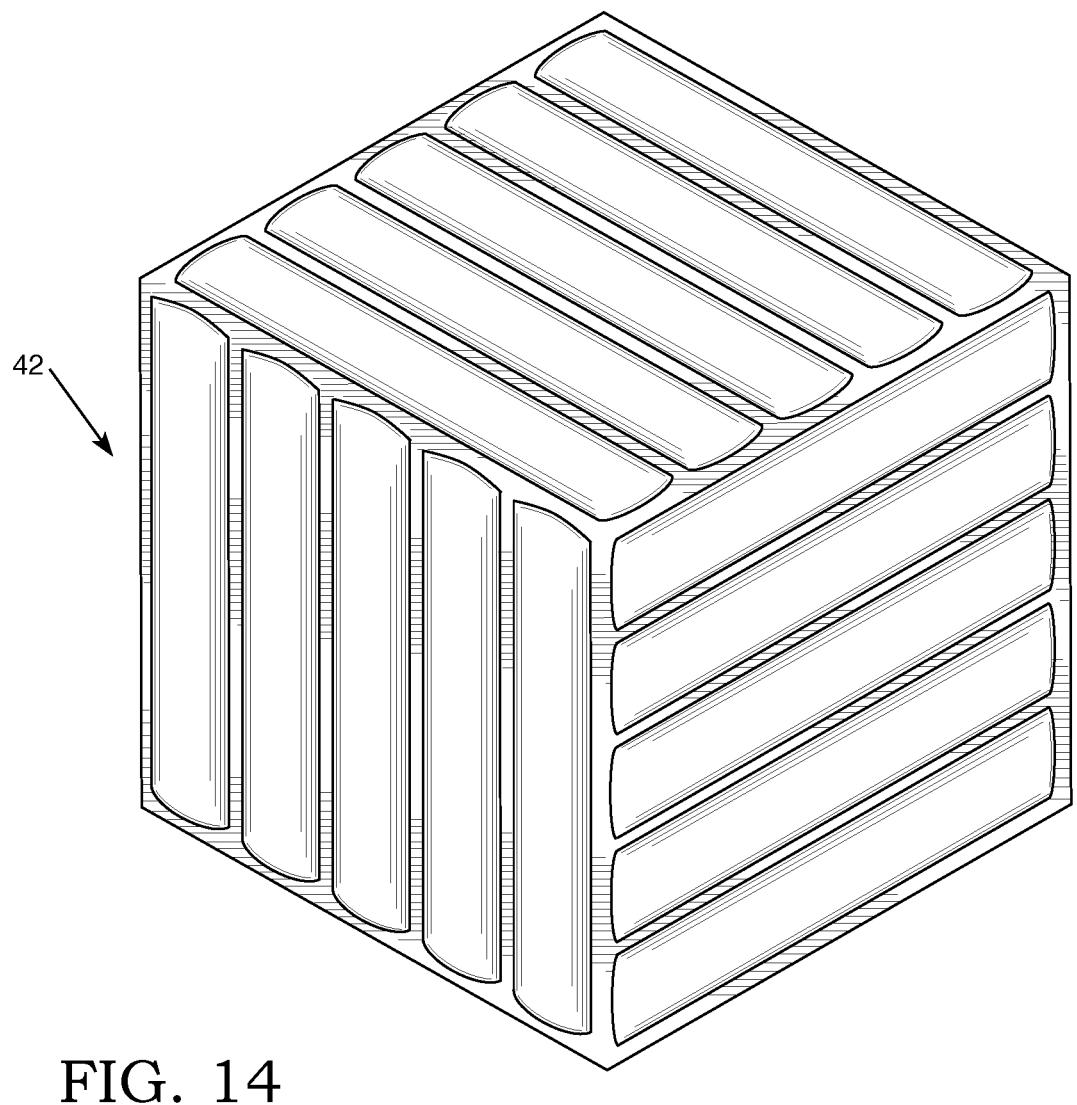
FIG. 14 is a perspective front view of a second exemplary tile that may be utilized in the sixth embodiment of the privacy apparatus.
Figure 15:
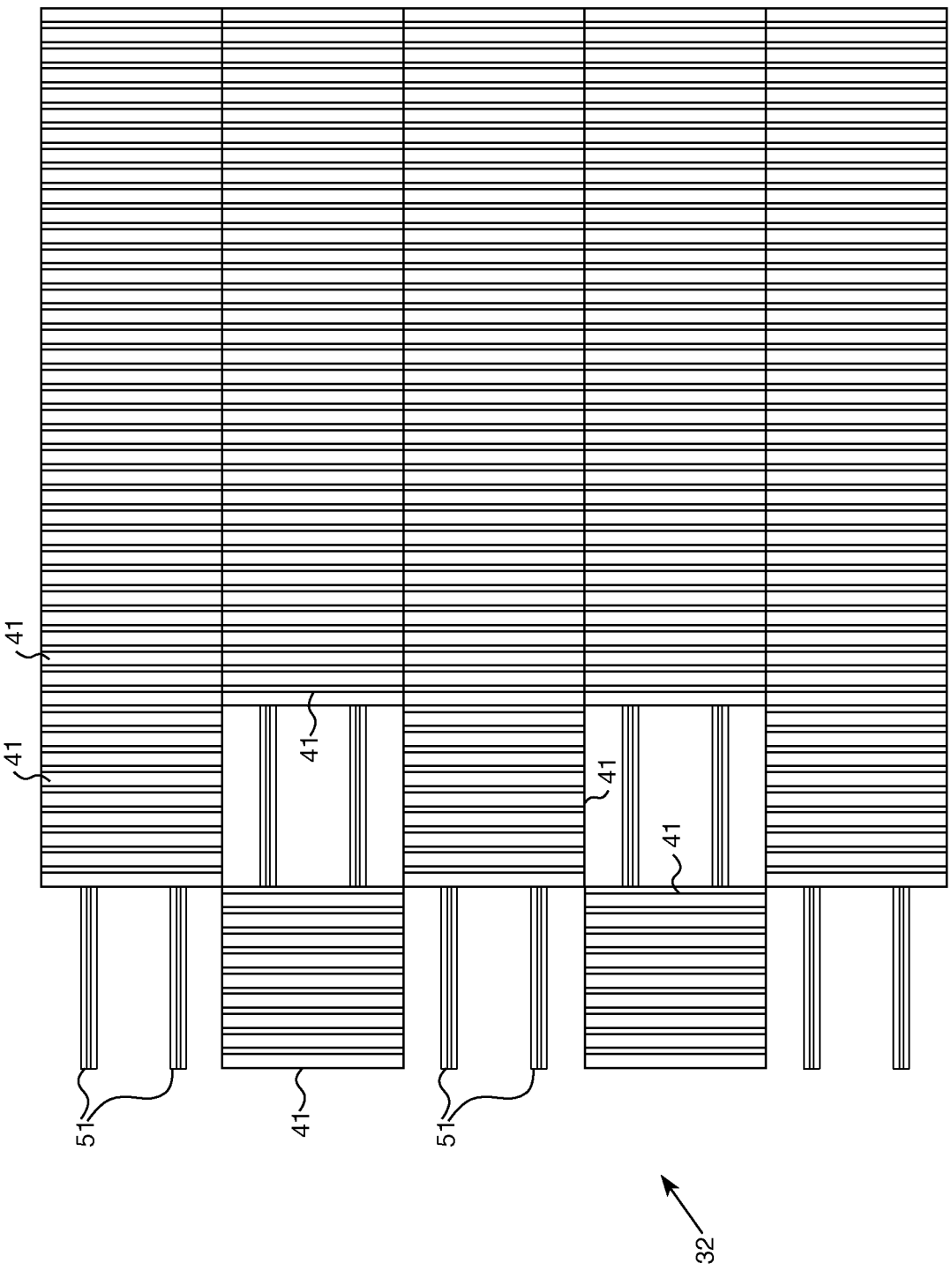
FIG. 15 is a perspective view of a wall covering element of the sixth embodiment of the privacy apparatus in the process of being constructed.
Figure 16:
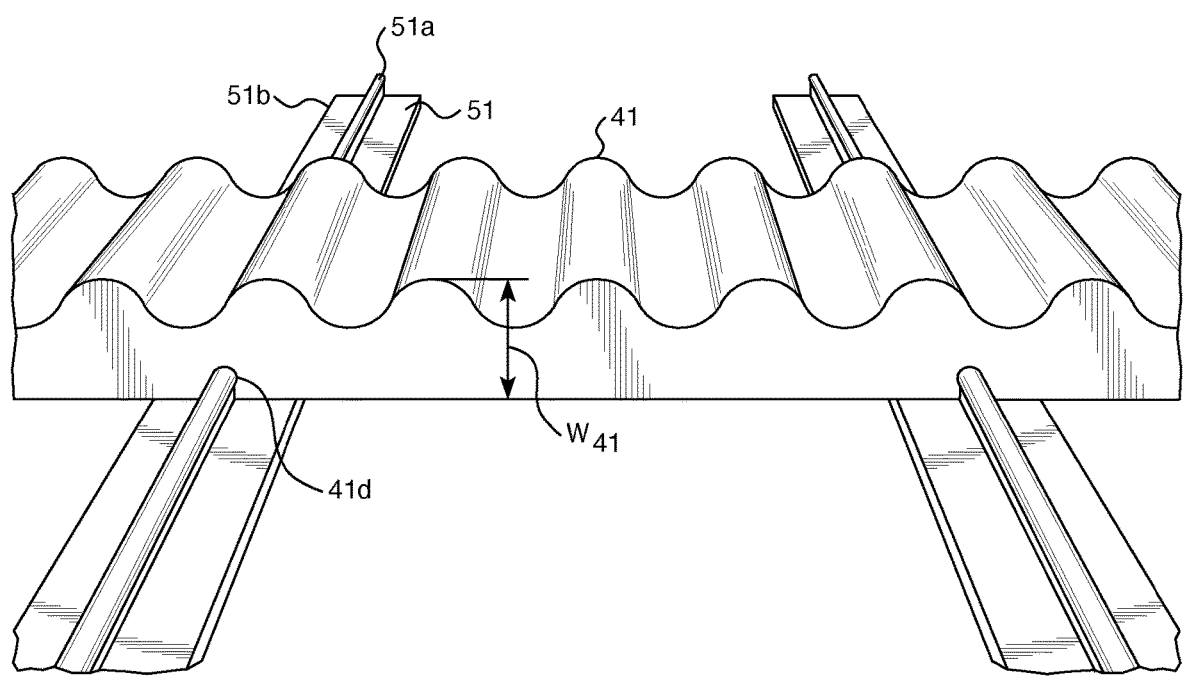
FIG. 16 is a perspective view of the wall covering element of the sixth embodiment of the privacy apparatus in the process of being constructed.
Figure 17:
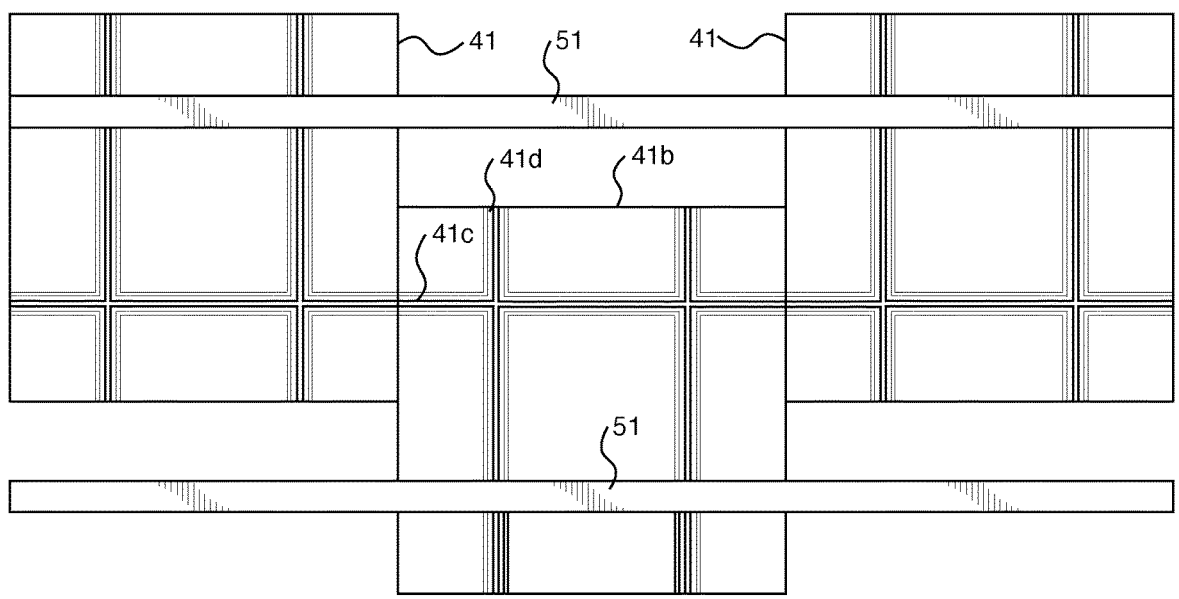
FIG. 17 is a perspective view of the wall covering element of the sixth embodiment of the privacy apparatus in the process of being constructed.
Figure 18:
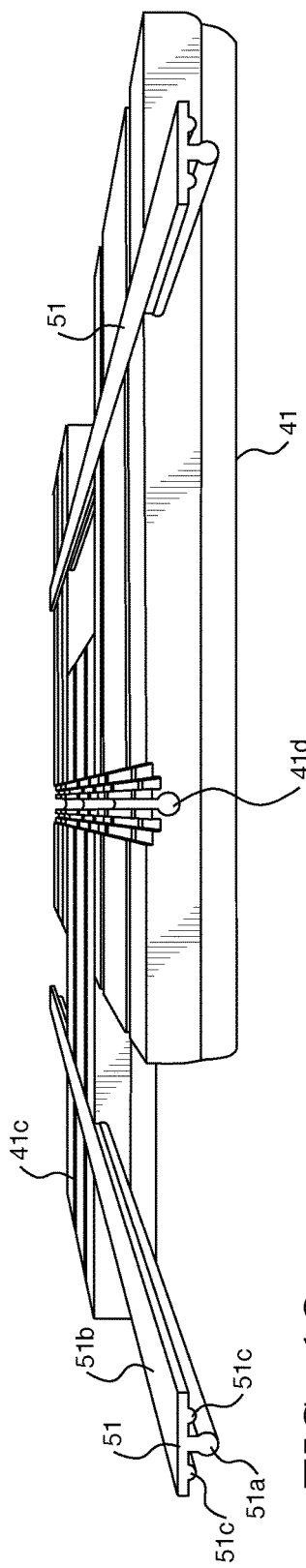
FIG. 18 is a perspective view of the wall covering element of the sixth embodiment of the privacy apparatus in the process of being constructed.

Referring to FIG. 13, the rear face 41b of the panel 41 can include a plurality of linearly extending openings such horizontally extending openings 41c that extend along a length L of the panel and a plurality of vertically extending openings 41d that extend along the height H of the panel 41. This type of arrangement of vertically and horizontally extending openings 41d and 41c can define a "tic-tac-toe" type shape where each vertically extending opening 41c intersects with multiple different spaced apart horizontally extending openings 41d. It is also contemplated that other openings may be defined in the rear face of each panel to facilitate other possible mounting options. For instance, openings could extend linearly at an angle that is 45° to the vertically extending and horizontally extending openings

41*d* and 41*c*. These angled openings could intersect with the vertically extending and horizontally extending openings 41*d* and 41*c*.

The linearly extending openings such horizontally extending openings 41*c* that extend along a length L of the panel and a plurality of vertically extending openings 41*d* that extend along the height H of the panel 41 can be configured to provide a press-fit releaseable attachment to elongated supports 51 that can be mounted to walls 31 of a building. The elongated wall mountable supports 51 may be elongated metal extrusions that have a flat mounting surface on a rear face of the supports that include holes defined therein for bolts, screws, or other types of fasteners to be used to extend through the holes of the supports 51 to attach the supports to the wall 31 of a building. The opposite face of the supports can include a particular shaped profile that includes at least one projection sized to be fit within the horizontally extending openings 41*c* or the vertically extending openings 41*d* for mounting of the panels to the supports 51 so that the panels can be positioned to cover at least a portion of the wall to which the supports 51 are mounted. The profile of each support 51 can be defined by the cross-sectional shape of the support, which may be generally L-shaped, Y-shaped, T-shaped, or V shaped.

For instance, a profile on a non-flat face of the support 51 can include a projecting member 51*a* that extends from a flat base portion 51*b* of the support 51 that is flat or substantially flat for mounting on a wall surface. The projecting member 51*a* can be shaped to be press-fit into a linearly extending opening in the panel so that the panel body is compressed to deform the opening for receiving and holding onto that projecting member 51*a*. The resiliency of the material of the panel can allow compression of that material around the projecting member to act on the projecting member 51*a* to hold onto that projecting member 51*a*. This can allow for the mounting of the panels 41 to occur without the need for any type of mounting tools. In other embodiments, it is contemplated that a hammer or other type of tapping tool could be used to help press fit the projecting members 51*a* into the openings defined in the rear faces of the panels 41.

Each support 51 can be composed of metal or other type of material. In some embodiments, the shape of each support and profile of the faces of the support can be defined via extrusion or other type of molding or fabrication process for the supports 51.

As can be seen from FIGS. 15-18, multiple panels 41 can be mounted to the supports 51 via the openings formed on the rear face of the panels for forming an arrangement of panels that provides a wall covering for the wall of an office building or wall structure for defining an office space that has a certain panel arrangement to provide a desired aesthetic effect. The panels can also improve privacy by providing a surface that is composed of cork or substantially composed of cork to help absorb sounds and otherwise keep communications that may take place in a particular work space quiet in addition to providing visual privacy.

Figure 19:
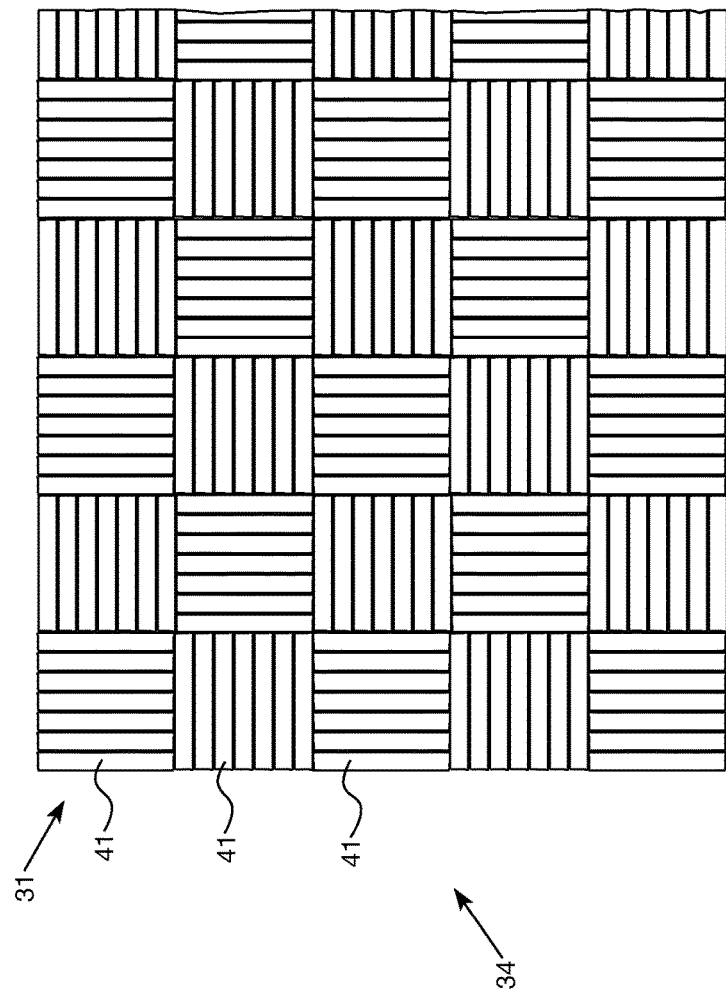
FIG. 19 is a perspective view of an exemplary embodiment of a constructed wall covering element that is utilizable in the sixth embodiment of the privacy apparatus.
Figure 20:
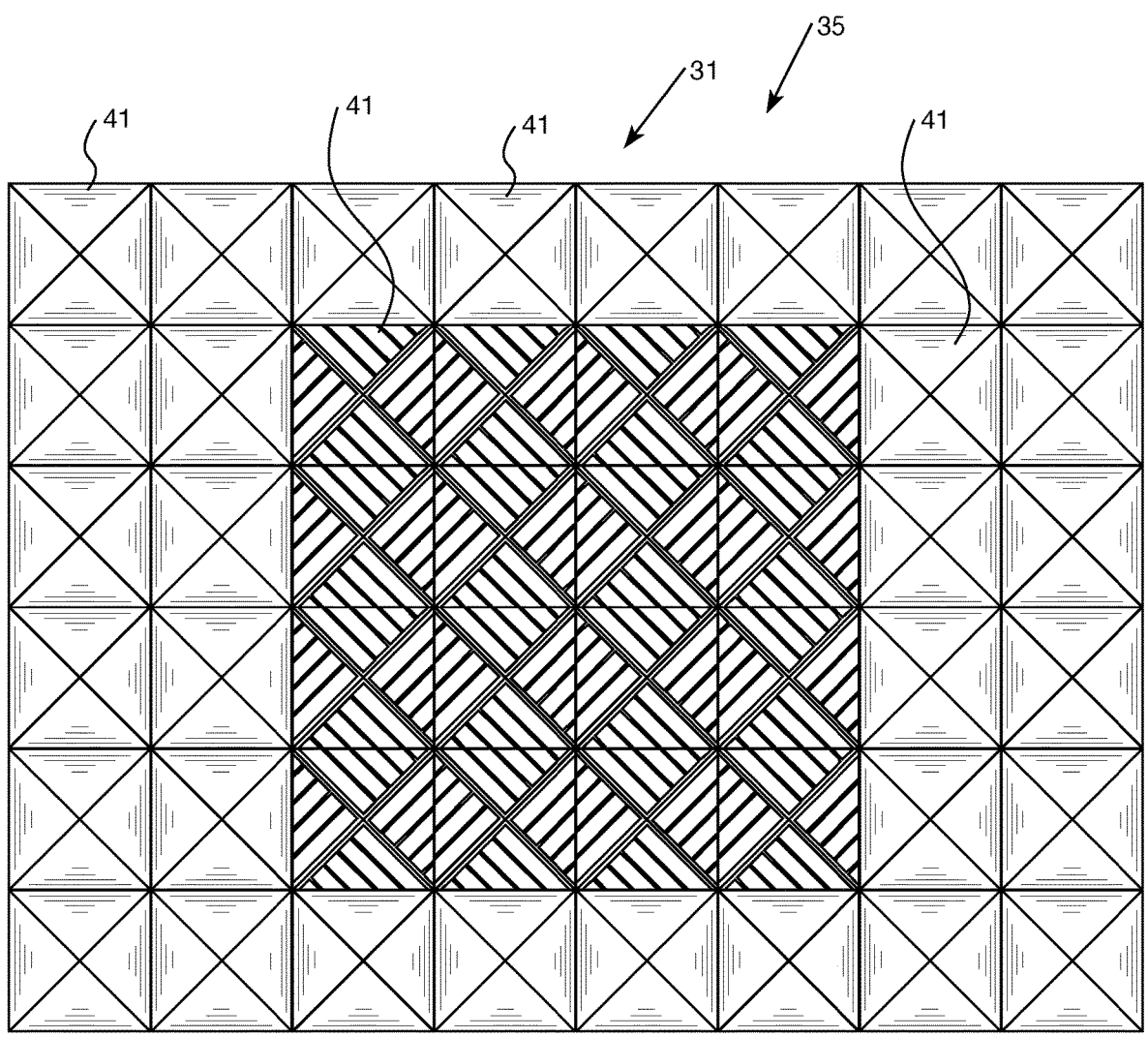
FIG. 20 is a perspective view of an exemplary embodiment of a constructed wall covering element that is utilizable in the sixth embodiment of the privacy apparatus.

The panels can be arranged so that the supports are mounted via the horizontally extending openings 41*c* or the vertically extending openings 41*d* to provide different arrangements for the panels and to provide for different shapes and patterns to be formed by the front faces of the panels being at different orientations. FIGS. 19 and 20 illustrate examples of the panel orientation adjustability provided by the different openings on the rear faces of the panels and the supports 51 that are resiliently received within those openings to mount the panels in a particular arrangement on a building's wall 31.

It should also be understood that the panel arrangements for building walls could alternatively be configured as stand-free walls or stand-alone walls comprised of interconnected panel bodies. For instance, supports 51 could alternatively have a configuration similar to support elements 8 shown in FIGS. 4-8 for the formation of wall structures that extend from a floor of a building. For such embodiments, vertically extending support elements 8 could attach to rear faces of multiple panels to define a wall structure similar to the free standing apparatus shown in FIGS. 4-8. Horizontally extending support elements could also be attached to the vertically extending support elements to provide additional rigidity support and attachment between panels to provide a wall defined by multiple panels that are interconnected via those support elements.

The panels 2 and 41 as well as other panels that may be used in other embodiments of the privacy apparatus may be composed substantially of cork or entirely of cork (e.g. over 50% cork, over 60% cork, over 70% cork, over 80% cork, over 90% cork, or 100% cork). For example, embodiments of the panels can be composed of cork bark that is ground into fine cork granules (or solid particulates) that are then mixed with resin granules to act as a binder for the ground cork granules. In some embodiments, all the ground cork may be ground from waste cork that was previously used in another process, such as the making of cork bottle stoppers or other cork composed elements such that the cork composition is entirely made from recycled cork material or at least substantially made from recycled cork material Examples of the binder resin may include a polymeric resin such as, for example, polyurethane or other type of polymeric resin. The resin material that is used may also be at least partially sourced or entirely sourced so that the resin material is composed of recycled material (e.g. a recycled polymeric material or a recycled thermoplastic material). In some embodiments, the material fed to the mold for making a panel may be composed of a mixture of 70% ground cork and 30% polymeric resin. In other embodiments, it is contemplated that the mixture may be composed of 55-85% cork and 15-45% resin binder. The combined dry mixture may then be fed into a mold via pouring or other distribution mechanism. The dry mix of binder and cork granules may then be heated and/or placed under a pre-selected amount of pressure to mold the dry mixture into a single solid unitary body having the shape of the mold. For instance, hot steam may be fed to the mold to pressurize and heat the mold for forming the panels. In some embodiments, it is contemplated that a binder may not be needed and that heat and pressure can be provided in the molding process via pressurized and heated steam that is fed to the mold after the mold is closed and the cork granules fill the mold.

The mold may be shaped so that each molded panel has a shape similar to panel 2, panel 41, panel 42 or other type of shape. The front face of the panel may differ in shape from the rear face of the panel so that the front face may provide a desired aesthetic effect while the rear face can provide a profile to facilitate attachment to support elements 8, base elements 6, and/or supports 51 for formation of a privacy apparatus. After a molded panel is extracted from a mold, it may be trimmed at its edges and otherwise processed to finalize the shape and structure of the panel. The formed panels may then be allowed to cool. After the panels have cooled, they may be shipped to a customer location and/or other location. In some embodiments, the panels may be shipped to a location that also receives support elements 8, base elements 6 and/or supports 51. Kits having a plurality of such support elements and panels can then be combined for shipping to a particular customer who may then form a privacy apparatus from those shipped parts to meet a particular design of that customer. Customers who receive supports 51 may also receive fasteners for the mounting of those supports 51 and instructions for how to assemble the panels to form one or more different designs of the privacy apparatus utilizing the support elements and panels provided to the customer.

In some embodiments, the ground cork bark can be obtained as scrap cork bark that is a byproduct of another process that utilized cork, such as the making of cork bottle stoppers. By use of such recycled materials, the composition of the panels can be composed mostly, if not entirely, of recycled materials. Further, metal support elements (e.g. support elements 8, support members 51, or base elements 6) can be composed of metal that includes recycled metal (e.g. recycled aluminum or steel). This can allow the entire kit of materials used to make a privacy apparatus and/or an entire embodiment of a privacy apparatus to be composed substantially of recycled materials. For instance, some embodiments are contemplated as being composed of at least 70% recycled materials.

In some embodiments, the panels 41 can be covered with a covering that covers their front faces to provide additional aesthetic options for the panels. For instance, a leather or fabric covering may be stapled to the rear face of the panel adjacent the panels edges to fasten a fabric or leather covering having a certain color or style to attach the covering to the front face of the panel to cover that front face of the panel. Instead of mechanical fastening, other mechanisms may be used to adhere and/or press the covering onto the front face (e.g. vacuum pressing, use of adhesives and presses, etc.).

Figure 21:
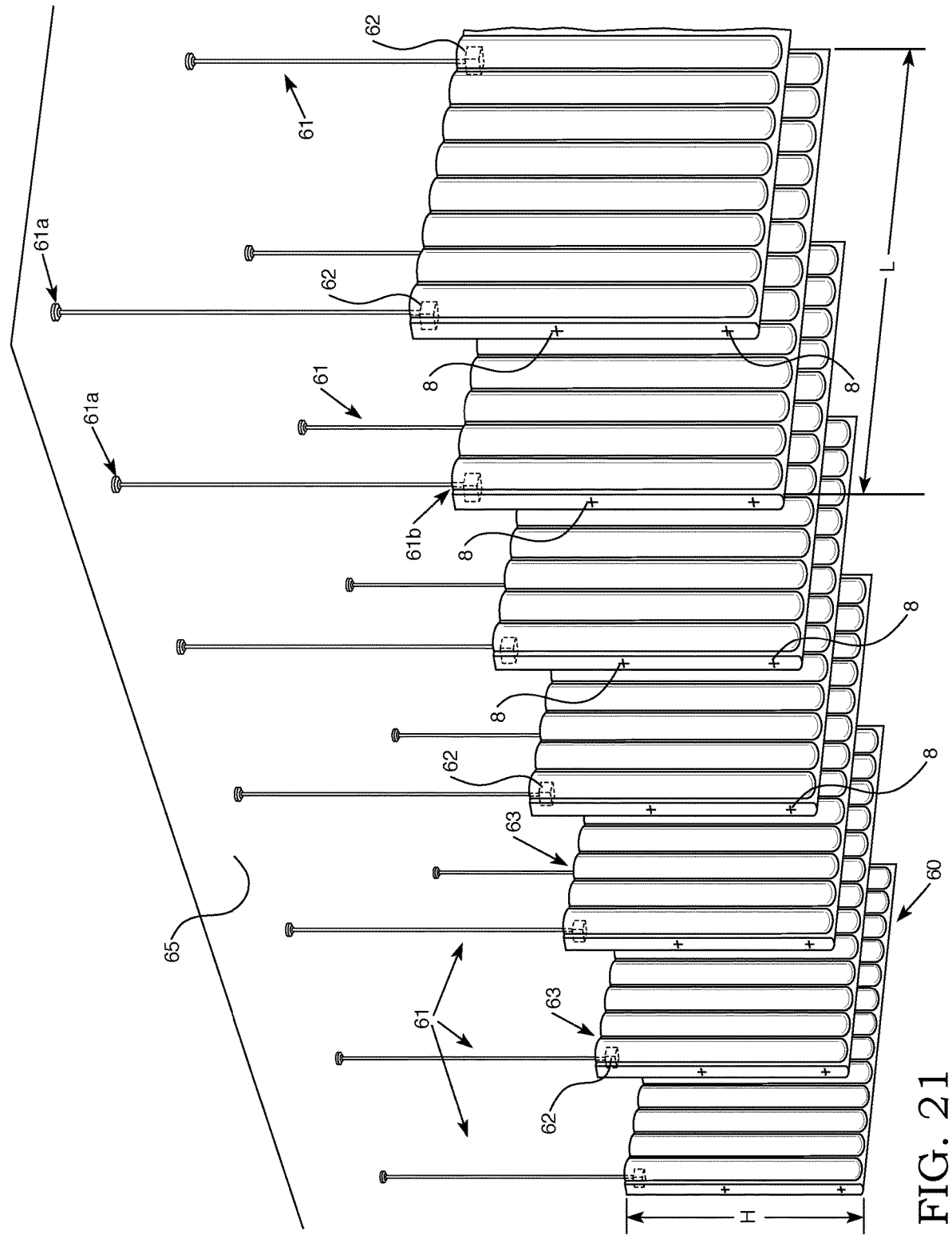
FIG. 21 is a perspective view of an exemplary embodiment of the privacy apparatus that is configured for positioning above a work space.
Figure 22:
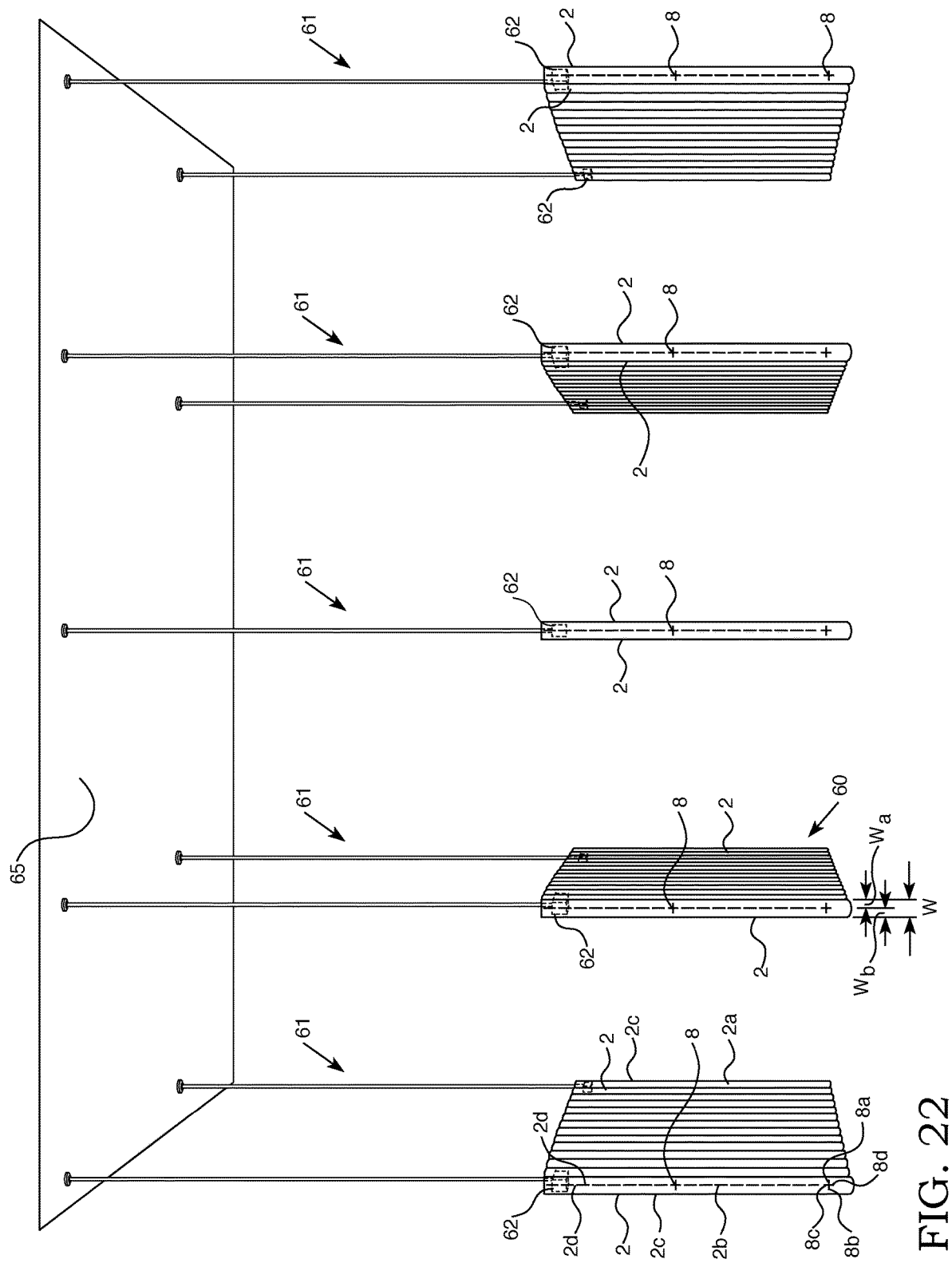
FIG. 22 is another perspective view of the exemplary embodiment of the privacy apparatus shown in FIG. 21.

It should be appreciated that embodiment of the cork panels, and/or privacy apparatuses having such cork panels may be made or structured in a number of different ways to meet a particular set of design criteria. For example, embodiments of the privacy apparatus can be configured as baffles to provide noise reduction, which may help improve the privacy of personnel within a room of a building or within a work space. Panels of the apparatus may be positioned above a work space in a room of a building by being hung from a ceiling 65 or otherwise being mounted adjacent to a ceiling of a room of a building (e.g. by being mounted to walls such that the panels may be positioned above a work space between opposed walls of a room of a building). FIGS. 21-22 illustrate an example of such a privacy apparatus, which can also be considered an arrangement of noise reduction baffles.

As can be seen from FIGS. 21-22, each baffle can be configured to have a body that is formed from the interconnection of multiple cork panels 2 together. The connection of a first panel 2a and a second panel 2b to form a body of the baffle can be configured similar to the body of the embodiment of the privacy apparatus 1 discussed elsewhere herein, such as, for example, the embodiments shown in FIGS. 4-8 and discussed above with respect to the embodiments of FIGS. 4-8. For instance, the body of each baffle 60 can be fabricated from a first panel 2a and a second panel 2b that are attached together via support elements 8 that can be press fit within openings defined in the rear faces of three panels. The elongated support elements 8 can be positioned between the first and second panels 2a and 2b to facilitate attachment of those panels together and to help improve a structure strength and/or rigidity of the body of the baffle 60. The support elements may be metallic, polymeric, or composite members that are elongated and formed to have a pre-selected cross-section and are configured to help provide additional rigidity, strength, and or toughness to interconnected panels 2.

The first and second panels 2a and 2b of each baffle 60 may each have the same construction and have the same width W, length L, and height H. Alternatively, it is contemplated that the first panel 2a could have one or more of these dimensions differ from that of the second panel 2b. Such a configuration of the panels could be provided to meet a particular design criteria and to match up with particular design configurations of ceiling mounting elements 61 and support elements 8.

As can be appreciated from FIGS. 6-8 and 21-22, the panels 2 can each be connected to support elements 8 and ceiling mounting elements 61 via press fitting those elements within openings 10 defined in a rear face of the panel. Such a configuration can allow for a fabrication of the baffles 60 to occur without the use of any mechanical tools (e.g. a screwdriver, hammer, wrench, etc.). The rear faces 2d of the panels 2 may contact each other upon the openings of the rear faces 2d receiving the support elements 8 and/or ceiling mounting elements 61 to form the body of the baffles.

The openings 10 can be shaped to have different segments of different depths within the panel 2. For instance, each opening 10, may have a central channel 10a that has a deeper depth within the panel than an outer channel 10b that surrounds the central channel 10a. The central and outer channels 10a and 10b can be sized and shaped to receive portions of support elements 8 and/or ceiling mounting elements 61. For example, each support element 8 may have a particular cross-sectional shape that defines a profile for being received within the central and outer channels 10a and 10b for being releaseably connected to the panel 2 via opening 10. The size of the central and outer channels 10a and 10b may be sized to resiliently compress upon a side of the support element 8 being inserted into the opening 10. The resiliency of the panel may then cause the area of the panel that defines opening 10 to resiliently push or press against the part of the support member received in the opening 10 to help hold the support member within the opening 10.

Each support element 8 can be shaped to have an X-shaped cross section in some embodiments that have a first side 8a, second side 8b, third side 8c, and fourth side 8d. Each side may help define the same profile so that any of the sides may be positioned within the opening 10. In other embodiments, it is contemplated that only two opposite sides of the support element 8 may have a pre-selected profile for receipt into a particular set of openings 10 defined in the rear faces of panels 2 that are to be joined together to form a body of a privacy screen.

The support elements 8 can have one or more projecting members extending from opposite sides of the elements (e.g. a first projecting member extending from a first side 8a and a second projecting member extending from a second side 8b opposite the first side). The support elements can also include projecting members that include multiple projecting members extending from different sides (e.g. a first projecting member extending from a first side 8a and a second projecting member extending from a second side 8b opposite the first side and a third projecting member extending from a third side 8c and a fourth extending member extending from a fourth side 8d that is opposite the third side, etc.).

The ceiling mounting elements 61 can also include an attachment portion 62 that has a cross-sectional profile for being received in one or more openings 10. Those openings 10 can have the same shape and structure as the openings for receiving the support elements 8 or may have different shapes for receiving different cross-sectional profiles or shapes of the attachment portion 62 of the ceiling mounting elements. The attachment portions 62 can extend vertically from an elongated portion of the ceiling mounting elements (e.g. a wire, rod, or bar) that may be configured to extend from a portion of a ceiling 65 (e.g. a finished ceiling or a drop ceiling). The cross-section of the attachment portion 62 of the ceiling mounting element 61 may be generally X-shaped and have multiple sides that are configured exactly like the cross-section of the support element 8 shown in FIGS. 7, 22, and 22. The rear face of each panel 2 may receive the attachment portion 62 via press-fit or other insertion into an opening 10 in the same way that the support member 8 is received and resiliently grasp that inserted attachment portion in the same way the support element 8 is resiliently grasped. In other embodiments, that cross-sectional shape of the attachment portion 62 of the ceiling mounting elements 61 may differ from the shape of the support elements 8 to mate with openings of a corresponding shape for receiving that other shape and the panel may resiliently grasp the inserted attachment portion 62 for holding the ceiling mounting elements 61 to the panel 2 and releaseably attaching the ceiling mounting element 61 to the panel 2 without a need for the user of any mechanical tool (e.g. wrench, screwdriver, hammer, etc.). Any number of baffles may be formed and mounted above a work space in any particular arrangement or array as desired to meet a particular set of design criteria.

In some embodiments, the length or height of the openings 10 of the panels 2 for forming the baffles 60 may be arranged differently. For instance, in some embodiments, the openings may extend continuously along the length L or height H of the panel. In other embodiments, some openings 10 may extend continuously along the length L or height H while other openings 63 may extend from an outer edge of the panel for a pre-selected distance in a direction that is transverse to those other openings (e.g. perpendicular or within 10° of perpendicular) as shown in FIG. 6. As can be seen from FIGS. 21, and 22, some of these openings 10 can be can be arranged as a second set of openings 63 that are positioned within a central region of the rear face of the panels or in one or more other regions between opposite ends of a panel and be oriented to extend in a vertical direction for retention of attachment portions 62. The vertical elongation of the second set of openings 63 can be configured so that these second openings extend in a direction that is transverse (e.g. perpendicular) to a first set of first openings that may extend along the entire length L of the panel for receipt of support elements 8 to provide certain pre-defined attachment profiles for the ceiling mounting elements 61 and/or to provide an improved strength of attachment at those locations between first and second panels 2a and 2b and/or to also provide greater stiffness at such regions. All the transverse openings of the second set of openings 63 may be located between two immediately adjacent spaced apart other openings 10 of the first set of openings. There may be additional sets of openings that are arranged between immediately adjacent spaced apart openings of the first set of openings as well. Each such set of openings may be arranged between a respective group of two immediately adjacent openings in the first set of openings.

The ceiling mounting elements 61 can be configured to have an upper end 61a configured to mounting to a ceiling or adjacent a ceiling and a second lower end 61b that is configured for attachment to attachment portion 62 positioned in the first and second panels 2a and 2b. The lower end can be threaded, for example, to be "screwed" into a hole of an attachment portion. As an alternative, the attachment portion 62 can have a threaded hole configured to receive a threaded projection of the lower end for attachment of the lower end of the elongated member of the ceiling mounting element 61 to the attachment portion 62. As yet another example, the attachment portion and lower end 61b of the elongated member may be integral with each other via welding or integral molding or may be otherwise attached together (e.g. interlocking, mateable profiles, etc.).

In yet other embodiments of the baffles 60, the end of the support elements 8 can be connected to a suspended wire, bar, rod, beam, or other mounting element for positioning the baffles above a work space adjacent a ceiling to provide a raised structure that provides noise reduction. In some embodiments, it is contemplated that the beam or bar may be configured to have the profile of the elongated support elements 8 so that the mounting member that extends between opposed walls is the support element 8 and is received within openings of the panels 2 to form the bodies of the baffles 60 to position the baffles above a work space in a room in a particular array of baffles. For such an arrangement, the ceiling mounting elements 61 may not be needed. An array of panels can be arrange via such mounting elements that may be suspended between opposed walls of a building in any of a number of different arrangements to meet a particular set of design criteria.

It should be understood that other changes to embodiments of the panels and application of bodies formed from one or more such panels can be provided to meet a particular set of design criteria. As yet another example, the cork composition of each panel can be selected to meet a particular set of design criteria. As another option, each panel 2, 41 or 42 can be molded via just cork or by having cork molded to opposite sides of a support element (e.g. a more rigid metal, wood, composite, or polymeric sheet, plate, bar, rod, tube, or other type of member). The type of aesthetic profile defined in the front face of each panel can be any of a number of shapes, or other profile features. Coloring additives may also be added to a mixture of ground cork and/or binder for providing a panel of a pre-selected color. As yet another example, the shape and arrangement of openings on a rear face of each panel and the shape and structure of support elements 8 or supports 51 or attachment portions 62 of ceiling mounting elements 61 can be any of a number of suitable shapes, geometries, lengths, widths, and thicknesses to meet a particular design objective. Some embodiments may be formed and designed so that no mechanical tool is needed for fabrication of the privacy apparatus while others may be designed so at least a hammer or other striking element is needed to help have panels press fit onto supports and/or base elements. Yet other embodiments may be designed so that at least screwdrivers or wrenches are needed to help mount supports 51 onto a wall for mounting of a panel arrangement to cover at least a portion of that wall or for mounting ceiling mounting elements 61 to a ceiling structure. As yet another example, the support elements 8, ceiling mounting elements 61, and/or supports 51 can be composed of any type of suitable material such as a metal like aluminum or steel or a polymeric material and be shaped as any number of types of members (e.g. rod, bar, shaft, tube, etc.) having any number of suitable cross-sections (e.g. X-shaped, Y-shaped, V-shaped, T-shaped, L-shaped, polygonal shaped, pyramid-shaped, etc.) Thus, while certain exemplary embodiments of privacy apparatuses and methods of making and using the same have been shown and described above, it is to be distinctly understood that the invention is not limited thereto but may be otherwise variously embodied and practiced within the scope of the following claims.

What is claimed is:

1. A method of forming a noise reduction apparatus for mounting adjacent to or above a work space, comprising:
   providing cork granules obtained from grinding cork bark;
   molding the cork granules in a mold to form a first panel, the first panel having a front face comprised of cork and a rear face opposite the front face, the rear face comprised of cork, the rear face having at least one opening define therein; and
   providing at least one support so that each support is extruded to have a base portion that is generally rectangular shaped, the base portion having a flat surface, each support also having at least one projection extending linearly along a length of the base portion and also extending from the base portion so that the at least one projection extends away from the flat surface, the at least one projection having a distal portion and an intermediate portion that is between the distal portion and the base portion, the distal portion being wider or bigger than the intermediate portion, the distal portion being sized to be press-fit within the at least one opening formed in the rear face of the first panel via the cork of the rear face resiliently deforming to accommodate the press-fit of the support within the at least one opening;
   wherein the at least one support comprises a first support and the at least one projection includes a first projection and a second projection, the second projection extending away from the flat surface and the first projection extending away from the flat surface such that the first projection extends farther away from the flat surface than the second projection;
   press-fitting the first projection of the first support into a first opening of the at least one opening of the rear face of the first panel via the cork of the rear face resiliently deforming to accommodate the press-fitting of the first projection within the first opening for direct attachment of the first support to the first panel; and
   press-fitting the second projection of the first support into a second opening of the at least one opening of the rear face of the first panel via the cork of the rear face resiliently deforming to accommodate the press-fitting of the second projection within the second opening for direct attachment of the first support to the first panel.

2. The method of claim 1, comprising:
   mixing the cork granules with a binder prior to molding of the cork granules; and
   wherein the molding of the cork granules comprises:
      applying heat and pressure to the cork granules in the mold to form the first panel.

3. The method of claim 2, comprising:
   attaching the rear face of the first panel to the support by press-fitting the first projection into the first opening of the at least one opening such that the cork of the rear face resiliently deforms so that the first projection is passable into the first opening and the cork of the rear face resiliently compresses around the first projection to hold the first projection in the first opening, the distal end portion of the first projection being curved or rounded.

4. The method of claim 3, comprising:
   mounting the first support on a wall of a room of a building so the flat surface of the first support directly contacts the wall, the first projection extends away from the flat surface.

5. The method of claim 1, comprising:
   mounting the first support on a wall of a room of a building so the flat surface of the first support directly contacts the wall;
   molding the cork granules in the mold to form a second panel, the second panel having a front face and a rear face opposite the front face, the rear face of the second panel having at least one opening define therein;
   press-fitting the first projection of the at least one projection into a first opening of the at least one opening of the rear face of the second panel;
   positioning the first panel adjacent to the second panel on the first support.

6. The method of claim 5, wherein the at least one support also comprising a second support, the method also comprising:
   mounting the second support on the wall;
   press-fitting a first projection of the at least one projection of the second support into a second opening of the at least one opening of the rear face of the second panel;
   press-fitting the first projection of the at least one projection of the second support into a third opening of the at least one opening of the rear face of the first panel.

7. The method of claim 6, wherein the press-fitting of the first projection of the first support and the press-fitting of the first projection of the second support are performed without use of any mechanical tools.

8. The method of claim 6, wherein each of the first opening of rear face of the first panel, the first opening of the rear face of the second panel, the third opening of the rear face of the first panel, and the second opening of the rear face of the second panel has a mouth and an inner aperture in communication with the mouth that is wider than the mouth,
   the first panel and the second panel each configured to resiliently deform to accommodate the press-fit by the cork resiliently compressing to receive the distal portion of the first projection of the first support and the distal portion of the first projection of the second support and resiliently act on the first projection of the first support and the first projection of the second support to retain the first projection of the first support and the first projection of the second support.

9. A method of forming a noise reduction apparatus for mounting adjacent to or above a work space, comprising:
   molding cork granules in a mold to form a first panel the first panel having a front face comprised of cork and a rear face opposite the front face, the rear face comprised of cork, the rear face having at least one opening define therein;
   molding cork granules in a mold to form a second panel, the second panel having a front face comprised of cork and a rear face opposite the front face, the rear face of the second panel comprised of cork, the rear face of the second panel having at least one opening define therein;
   providing a first support so that the first support is extruded to have a base portion that is generally rectangular in shape, the base portion having a flat surface and the first support also having at least one projection that is elongated and extends linearly on the base portion along a length of the first support, the at least one projection also extending away from the flat surface, the at least one projection being sized to be press-fit within the at least one opening formed in the rear face of the first panel and also sized to be press-fit within the at least one opening formed in the rear face of the second panel, wherein the first support has a first projection of the at least one projection and a second projection of the at least one projection that extends from the base portion, the second projection extending away from the flat surface to a distal portion, the first projection extending farther away from the flat surface than the second projection, and wherein the first projection has a distal portion and an intermediate portion that is between the distal portion and the base portion, the distal portion of the first projection being wider or bigger than the intermediate portion;

press-fitting the first projection of the at least one projection into a first opening of the at least one opening of the rear face of the first panel via the cork of the rear face resiliently deforming to accommodate the press-fitting of the first projection within the first opening for direct attachment of the first support to the first panel;

press-fitting the first projection of the at least one projection into a first opening of the at least one opening of the rear face of the second panel via the cork of the rear face resiliently deforming to accommodate the press-fitting of the first projection within the first opening for direct attachment of the first support to the second panel;

press-fitting the second projection of the at least one projection into a second opening of the at least one opening of the rear face of the first panel via the cork of the rear face resiliently deforming to accommodate the press-fitting of the second projection within the second opening for direct attachment of the first support to the first panel;

press-fitting the second projection of the at least one projection into a second opening of the at least one opening of the rear face of the second panel via the cork of the rear face resiliently deforming to accommodate the press-fitting of the second projection within the second opening for direct attachment of the first support to the second panel;

positioning the first panel adjacent to the second panel on the first support; and mounting the first support on the wall via fasteners so that the flat surface of the first support directly contacts the wall and the first projection of the first support extends away from the wall.

10. The method of claim 9, comprising:

mounting a second support on the wall via fasteners passed through the second support to mount the second support on the wall, the second support being extruded to have a flat surface and at least one projection extending away from the flat surface that is sized to be press-fit within a third opening of the at least one opening formed in the rear face of the first panel and also sized to be press-fit within a third opening of the at least one opening formed in the rear face of the second panel, the second support mounted on the wall such that fasteners pass through the flat surface so that the flat surface directly engages the wall;

press-fitting a first projection of the at least one projection of the second support into the third opening of the rear face of the second panel; and press-fitting the first projection of the second support into the third opening of the rear face of the first panel.

11. The method of claim 10, wherein the first opening of the rear face of the second panel and the second opening of the rear face of the second panel extend parallel to each other.

12. The method of claim 9, wherein the first opening of the rear face of the first panel and the second opening of the rear face of the first panel extend parallel to each other.

13. The method of claim 9, wherein, the first opening of the rear face of the first panel and the second opening of the rear face of the first panel linearly extend along a length of the first panel.

14. The method of claim 9, wherein the first opening of the rear face of the first panel and the second opening of the rear face of the first panel linearly extend along a height of the first panel.

15. The method of claim 9, wherein the first panel is comprised of over 50% cork and the second panel is comprised of over 50% cork.

16. The method of claim 15, comprising:

mounting the first support on a wall of a room of a building.

17. The method of claim 15, comprising:

mounting the first support on a ceiling of a room of a building.

18. The method of claim 9, wherein the first opening of the rear face of the first panel has a mouth and an inner aperture in communication with the mouth that is wider than the mouth, and the first panel is configured to resiliently deform to accommodate the press-fit by the cork resiliently compressing to receive the distal portion of the first projection of the first support and resiliently act on the first projection of the first support to retain the first projection of the first support.

* * * * *